United States Patent
Harmon et al.

(10) Patent No.: US 12,351,134 B2
(45) Date of Patent: Jul. 8, 2025

(54) VEHICLE CONSOLE HAVING RIDE SHARE AND/OR DELIVERY SERVICE FEATURES

(71) Applicant: Ford Global Technologies, LLC, Dearborn, MI (US)

(72) Inventors: Michael John Harmon, Northville, MI (US); Minsung Kim, Irvine, CA (US); Eva Ross, Venice, CA (US); Vivien Martinage, Grosse Pointe Farms, MI (US); Henry Bernardo, Southfield, MI (US); Brad Zercoe, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 18/085,824

(22) Filed: Dec. 21, 2022

(65) Prior Publication Data
US 2024/0208426 A1    Jun. 27, 2024

(51) Int. Cl.
*B60R 7/08* (2006.01)
*B60R 11/00* (2006.01)
*B60R 11/02* (2006.01)

(52) U.S. Cl.
CPC ............ *B60R 7/08* (2013.01); *B60R 11/0229* (2013.01); *B60R 2011/0007* (2013.01); *B60R 2011/0294* (2013.01)

(58) Field of Classification Search
CPC .................. B60R 7/08; B60R 11/0229; B60R 2011/0007; B60R 2011/0294; B60R 7/04; B60N 2/793; B60N 3/08; B60N 3/101; B60N 3/104
See application file for complete search history.

(56) References Cited

U.S. PATENT DOCUMENTS

| | | | | |
|---|---|---|---|---|
| 4,796,791 | A | * | 1/1989 | Goss ..................... B60N 3/08 248/650 |
| 5,085,481 | A | * | 2/1992 | Fluharty .................. B60R 7/04 296/37.14 |
| 5,106,143 | A | * | 4/1992 | Soeters .................... B60N 2/75 292/303 |
| 6,514,021 | B2 | | 2/2003 | Delay |
| 6,719,343 | B2 | * | 4/2004 | Emerling ................ B60R 11/00 224/555 |
| 7,029,048 | B1 | | 4/2006 | Hicks et al. |
| 7,104,580 | B2 | | 9/2006 | Clark et al. |

(Continued)

FOREIGN PATENT DOCUMENTS

DE    10321837 A1    12/2004
EP    3075603 B1 *  7/2018  ............ B60N 2/015

OTHER PUBLICATIONS

DE 19808381 A1 with English Translation (Year: 1999).*

(Continued)

*Primary Examiner* — Lori Lyjak
(74) *Attorney, Agent, or Firm* — Vichit Chea; Price Heneveld LLP

(57) ABSTRACT

A vehicle console has a base, a connector assembly configured to connect the base to a vehicle support, a housing supported on the base, the housing comprising a first compartment and a second compartment, a lid covering the first compartment and defining an armrest on a top surface, at least one tray for holding one or more items in position within the second compartment, and a display device supported by the housing.

18 Claims, 36 Drawing Sheets

(56) References Cited

U.S. PATENT DOCUMENTS

| | | | | |
|---|---|---|---|---|
| 7,370,898 | B2* | 5/2008 | Sturt | B60R 7/04 |
| | | | | 296/37.8 |
| 7,938,470 | B2* | 5/2011 | Vander Sluis | B60R 7/04 |
| | | | | 220/495.08 |
| 9,776,572 | B2* | 10/2017 | Mizobata | B60R 11/00 |
| 11,358,531 | B2* | 6/2022 | Heinz | B60R 7/04 |
| 11,541,819 | B2* | 1/2023 | Booth | E05B 85/10 |
| 2002/0140246 | A1* | 10/2002 | Worrell | B60R 7/04 |
| | | | | 296/37.8 |
| 2005/0035618 | A1* | 2/2005 | Toth | B60N 2/793 |
| | | | | 296/24.34 |
| 2020/0361356 | A1* | 11/2020 | Hodge | G07F 7/08 |
| 2024/0190321 | A1* | 6/2024 | Salter | B60R 11/0229 |

OTHER PUBLICATIONS

DE 102005003877 A1 with English Translation (Year: 2006).*
U.S. Appl. No. 18/085,809 (3 pages of filing receipt, 31 pages of application and 36 pages of drawings), filed Dec. 21, 2022, entitled "Vehicle Console Having Repositionable Table."
U.S. Appl. No. 18/085,815 (4 pages of filing receipt, 31 pages of application and 36 pages of drawings) filed Dec. 21, 2022, entitled "Vehicle Console Having Removable Module."
U.S. Appl. No. 18/085,832 (4 pages of filing receipt, 30 pages of application and 36 pages of drawings) filed Dec. 21, 2022, entitled "Vehicle Media Console."
U.S. Appl. No. 18/085,839 (4 pages of filing receipt, 31 pages of application and 36 pages of drawings) filed Dec. 21, 2022, entitled "Vehicle Console Having Cooler Arrangement."

* cited by examiner

VEHICLE CONSOLE HAVING RIDE SHARE AND/OR DELIVERY SERVICE FEATURES

FIELD OF THE DISCLOSURE

The present disclosure generally relates to consoles, and more specifically relates to a modular console for carrying items on a vehicle.

BACKGROUND OF THE DISCLOSURE

Motor vehicles are commonly equipped with storage compartments, such as consoles. For example, a center console is often installed between a driver seat and a passenger seat in a row of seating in a passenger motor vehicle. The center console typically has a main storage compartment with a lid which also commonly serves as an armrest and may include one or more drink holders and other storage compartments. It would be desirable to provide for a center console which offers enhanced features for use on a motor vehicle.

SUMMARY OF THE DISCLOSURE

According to a first aspect of the present disclosure, a vehicle console is provided and including a base, a connector assembly configured to connect the base to a vehicle support, a housing supported on the base, the housing comprising a first compartment and a second compartment, a lid covering the first compartment and defining an armrest on a top surface, at least one tray for holding one or more items in position within the second compartment, and a display device supported by the housing.

Embodiments of the first aspect of the present disclosure can include any one or a combination of the following features:
 the display device provides a user interface to access one or more items in the at least one tray;
 the items comprise items for sale or servicing;
 the tray has a showcase for displaying the one or more items;
 the console is configured as a center console;
 the display is located on a rear end of the housing proximate to seating rear of the console;
 the lid comprises a deployable table;
 comprising a third compartment that defines a garbage container;
 the garbage container comprises a rim for holding a bag;
 at least one airflow duct extending through the housing from the base and having an airflow outlet for passing airflow; and
 the housing is removable from the base.

According to a second aspect of the present disclosure, a vehicle center console is provided and includes a base, a connector assembly configured to connect the base to a vehicle support, a housing supported on the base, the housing comprising a first compartment and a second compartment, a lid covering the first compartment and defining an armrest on a top surface, at least one tray for holding service supplies in position within the second compartment, and a display device supported by the housing, wherein the display device provides a user interface to access one or more items in the tray.

Embodiments of the second aspect of the present disclosure can include any one or a combination of the following features:
 the items comprise items for sale or servicing;
 the display is located on a rear end of the housing proximate to seating rear of the console;
 the lid comprises a deployable table;
 a third compartment that defines a garbage container;
 the garbage container comprises a rim for holding a bag;
 at least one airflow duct extending through the housing from the base and having an air outlet for passing airflow;
 the housing is removable from the base; and
 the tray has a showcase for displaying the one or more items.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
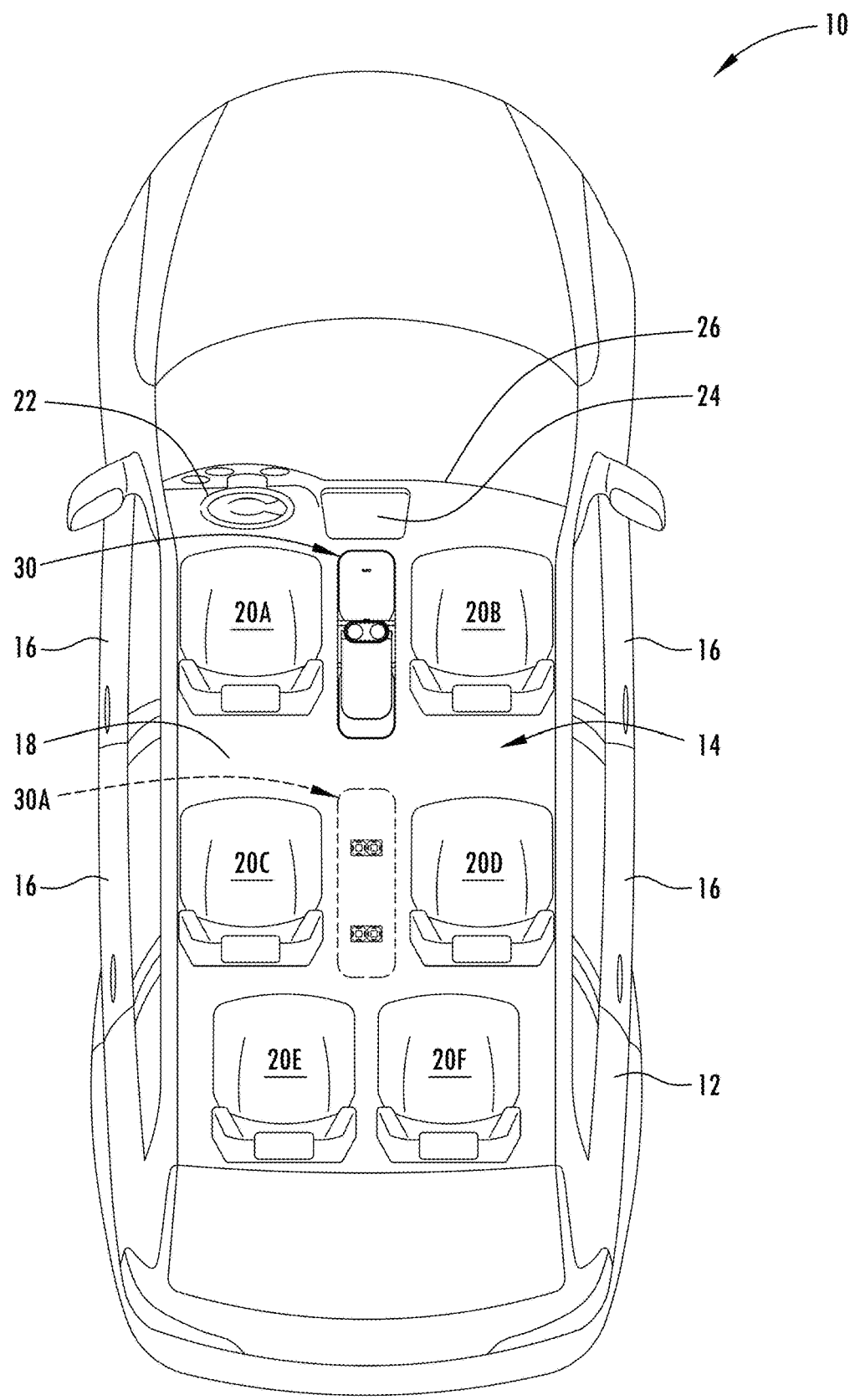
FIG. 1 is an upper side perspective view of a cabin interior of a motor vehicle equipped with a front center console and a rear center console, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a modular vehicle console. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating for transporting one or more passengers including a driver of the vehicle 10 and for further transporting one or more items onboard the vehicle 10. The motor vehicle 10 has a vehicle body 12 that generally defines a cabin interior 14. The cabin interior 14 may contain various features and trim components. The cabin interior 14 is shown having an arrangement of front row passenger seats including a first seat assembly 20A configured to seat a driver and a second seat assembly 20B configured to seat a passenger. The first and second seat assemblies 20A and 20B may be configured as captain seats, for example, laterally spaced apart and separated by space that includes a front center console 30 that may be configured according to various embodiments shown and described herein. The motor vehicle 10 illustrated in the example also includes additional seating such as a second row of seating including third and fourth seat assemblies 20C and 20D spaced apart and separated by a rear center console 30A that may be configured according to the various embodiments shown and described herein, and a third row of seating including fifth and sixth seat assemblies 20E and 20F. The motor vehicle 10 may include additional seating as is common for a large van or bus. It should be appreciated that the vehicle 10 may be a motor vehicle, such as a wheeled car, truck, SUV, van or bus, for example, or an airplane, train, boat or other vehicle capable of transporting one or more passengers and items.

The motor vehicle 10 is illustrated with a front row of seating having the first seat assembly 20A located on one lateral side (e.g., the left side) of the first row and vehicle rearward of a dashboard 26 and a steering wheel 22 and configured for seating a driver of the vehicle 10. The first seat assembly 20A includes a seat base and a seat back. The second seat assembly 16 is shown positioned vehicle rearward of the dashboard 26 on the opposite lateral side (e.g., right side) of the front row of seating and has a seat base and a seat back configured for seating a passenger. The vehicle body 12 has a plurality of side doors 16 that allow the driver and passengers to enter and exit the cabin interior 14 to access the seat assemblies 20A-20F. In the example shown, the driver seat assembly 20A is located adjacent to a lateral left side door 16 and the passenger seat assembly 20B is located adjacent to an opposite lateral right side door 16. Passengers may gain access to or exit from the second and third rows of seat assemblies 20C-20F via the rear side doors 16.

The cabin interior 14 is shown equipped with a front center console 30 located in the space between the driver first seat assembly 20A and the passenger second seat assembly 20B in the front first row of seating. In addition, the cabin interior 14 is also shown having a rear center console 20A located in a space between the third and fourth seat assemblies 20C and 20D in the middle second row of seating. It should be appreciated that the center console 30 or 30A may be located at various locations within the vehicle 10, such as between other adjacent seat assemblies. For example, a console may be located in a space between the fifth and sixth seat assemblies 20E and 20F in the rear third row of seating.

The vehicle console 20 is shown and described herein in accordance with various different embodiments for providing a console adjacent to one or more vehicle seating assemblies in the motor vehicle 10 that offers various features and accessories. For example, the vehicle console 30 may provide storage space such as one or more compartments for storing one or more items on the motor vehicle 10. In addition, the vehicle console 30 may provide an armrest for a driver or passenger of the motor vehicle 10 to rest their arm upon. Further, the vehicle console 30 may include a worktable that provides a worksurface upon which a user may utilize for purposes of work, for example. Further, the vehicle console 30 may include other features and accessories, such as various types of removable modules that may be added or removed from the console housing and may include different bases and housings that may be added or replaced with other bases and console housing, according to the various embodiments shown and described herein.

Additive Console

Figure 2A:
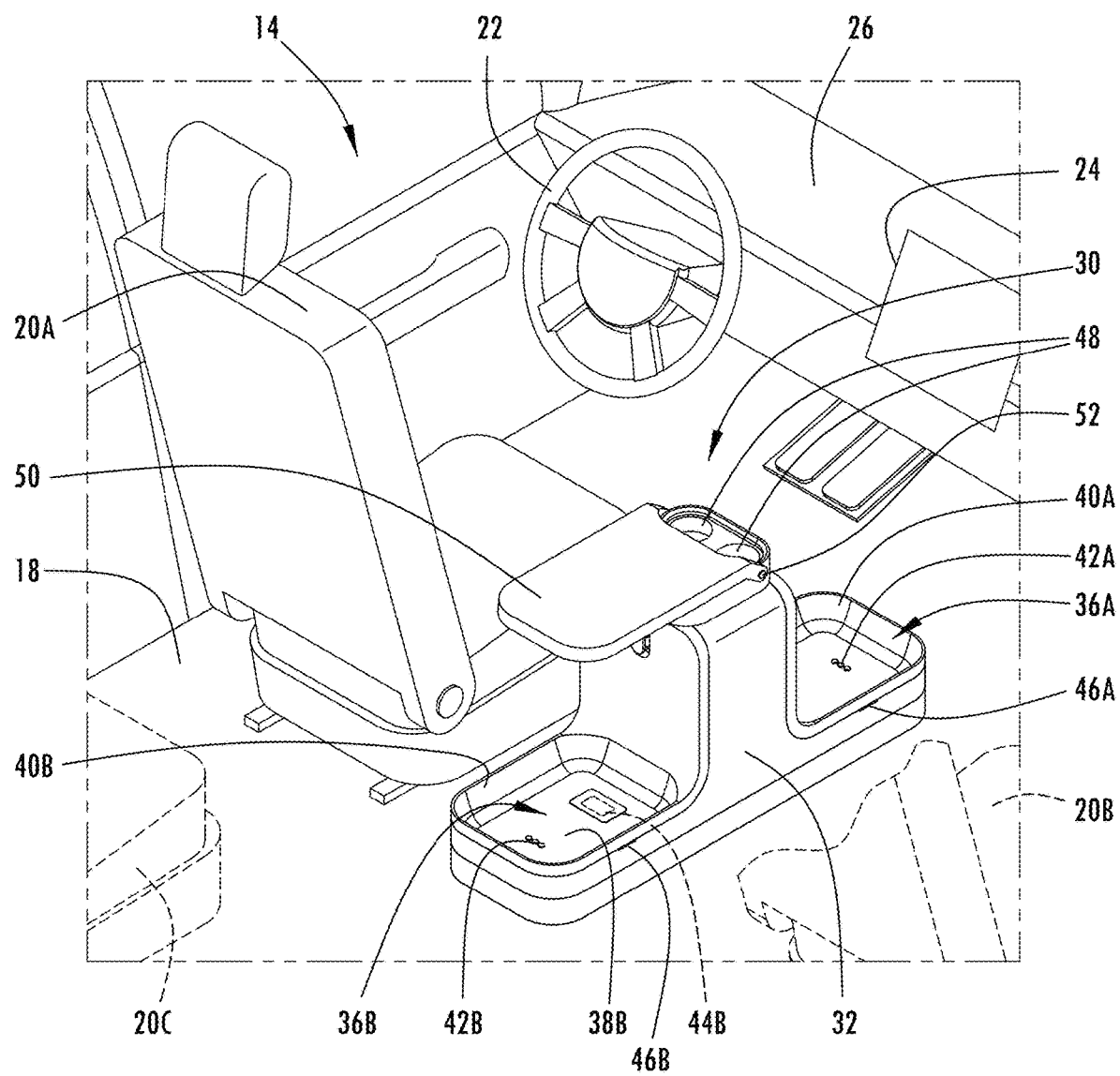
FIG. 2A is a rear perspective view of the cabin interior showing a first embodiment of a modular center console configured with module holders to hold removable modules.

Referring to FIGS. 2A-7F, a vehicle console 30 is illustrated according to a first embodiment configured with first and second module holders 36A and 36B that are each configured to receive and hold different selectable removable modules. With particular reference to FIG. 2A, the vehicle console 30 is shown installed vehicle rearward of a rearward facing display device 24, such as a touchscreen display, that is shown mounted on or proximate to the vehicle dashboard 26 at the front end of the cabin interior 14. The vehicle console 30 has a housing 32 that serves as a spline and also may serve as a base in this embodiment that is shown fixedly attached onto a supporting structure such as the underlying vehicle floor 18, according to one example. It should be appreciated that the housing 32 may include a separate base attached to the housing 32 and vehicle floor 18 and may otherwise be fixedly attached onto another supporting structure on the motor vehicle 10. The housing 32 may be mounted to the vehicle floor 18 via fasteners such as screws or bolts or may be welded or may be otherwise connected to the vehicle floor 18 in a manner to be removable.

The housing 32 generally defines a first module holder 36A generally shown on the front side facing a front side of the motor vehicle 10 and a second modular holder 36B generally defined on the rear side and facing a rear side of the motor vehicle 10. The first module holder 36A is generally defined along a perimeter by a generally rectangular upstanding sidewall 40A that extends upward from a holder floor 38A and may include rounded corners. The first module holder 36A is generally shaped to receive a base 60 of a removable module which may be selected from a plurality of available modules 70A-70F as shown in FIGS. 7A-7F, for example. Formed on the outside of the sidewall 40A is a retention detent 46A. It should be appreciated that a retention detent 40A may be provided on each of the opposite lateral left and side sides of the module holder 36A and on the front side of the module holder 36A. The retention detents 46A are configured to be engaged by a securing clip 62 on a removable module to removably secure the module fixedly on the module holder 36A. In addition, the module holder 36A has a plurality of electrical contacts 42A shown provided in the holder floor 38A and exposed on top to allow for contact with contacts in a module. The electrical contacts 42A may provide a supply of electrical power from the vehicle battery and may allow for data communication with vehicle electronics via electrical contacts 78 on the bottom side of the module installed in the module holder 36A.

The second module holder 36B is provided on the rear side of the housing 32 and likewise includes a generally rectangular upstanding sidewall 40B extending around a perimeter from the holder floor 38B and may include rounded corners shaped to conform to the shape of the base 60 of a removable module to be received in the second module holder 36B. The second module holder 36B likewise includes a retention detent 46 shown formed in an outer sidewall. It should be appreciated that the retention detent 46 may be provided in each of the opposite lateral left and right sidewalls of the module holder 36B as well as on the rear wall of the module holder 36B and is each configured to engage a securing clip on the removable module to fixedly hold the module in place on the second module holder 36B. The second module holder 36B likewise includes a plurality of electrical contacts 42B shown provided in the module floor 38B which may be configured to provide electrical power from the vehicle battery and may allow for data communication with vehicle electronics via electrical contacts on the bottom side of the removable module.

Figure 2B:
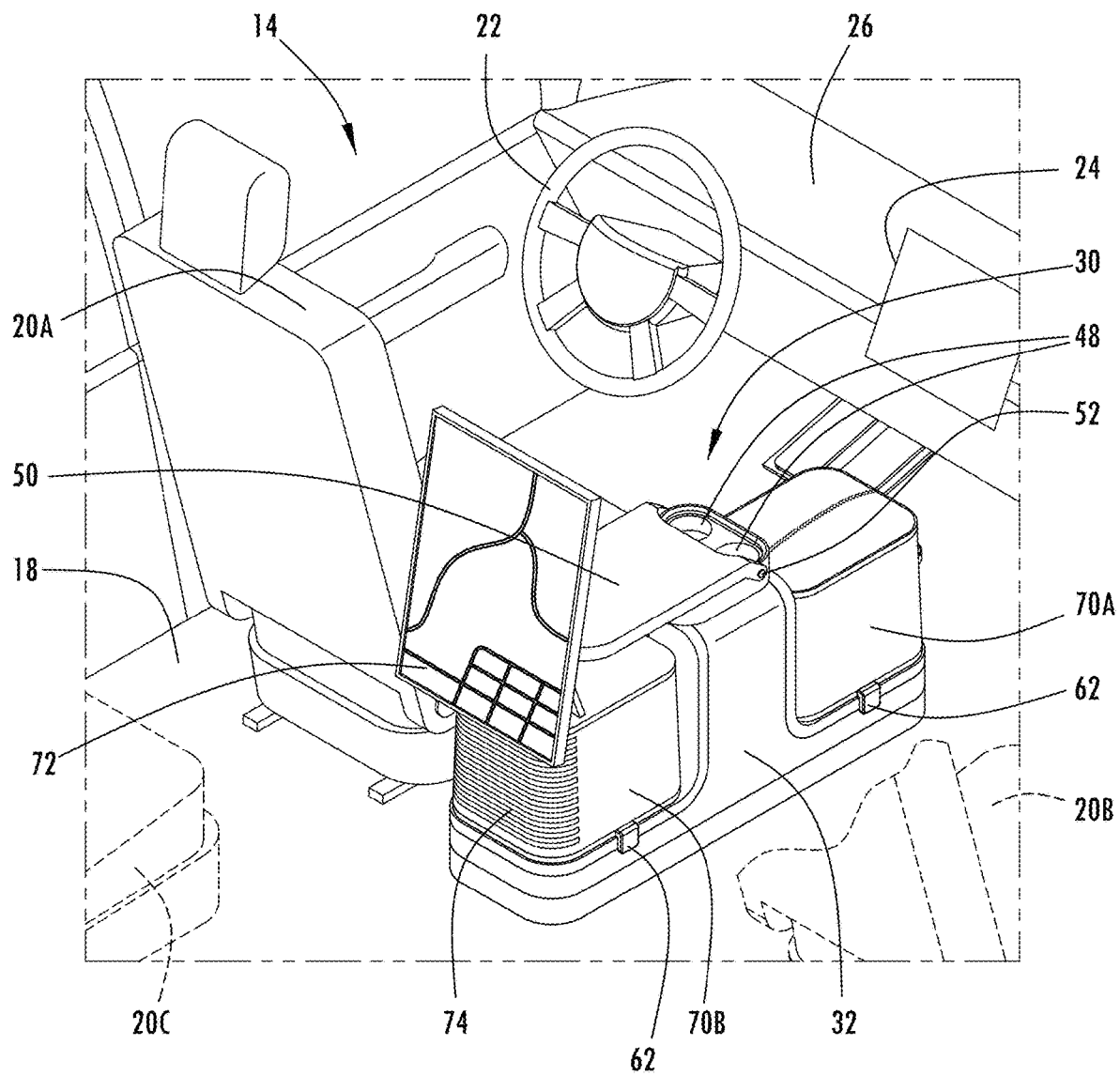
FIG. 2B is a rear perspective view of the cabin interior showing the modular center console equipped with front and rear modules, according to one example.
Figure 6:
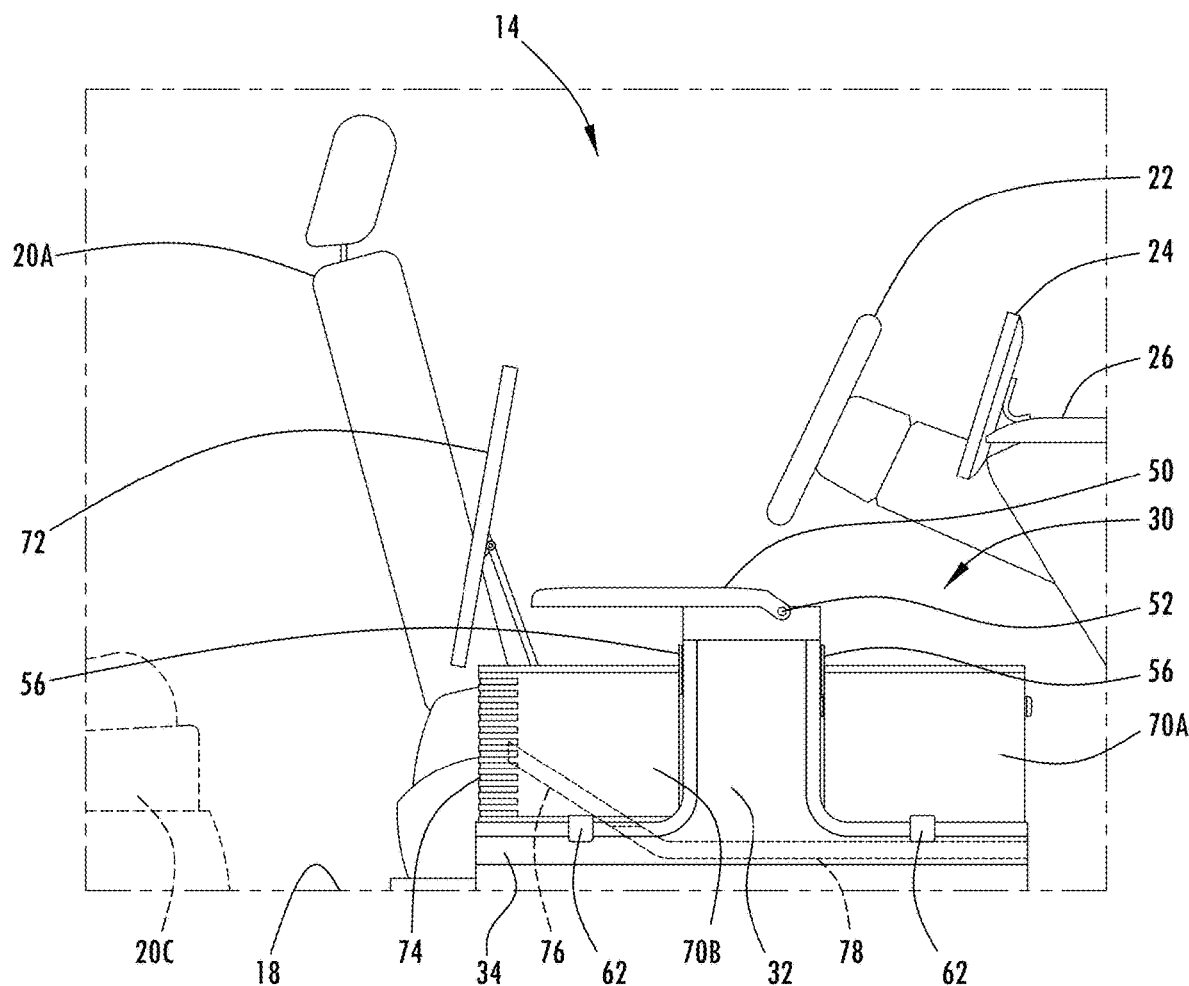
FIG. 6 is a schematic side view of the modular center console shown in FIG. 2B further illustrating the air ventilation flow path.

The second module holder 36B is shown having a ventilation or airflow duct port 44B provided in the holder floor 38B which may receive airflow for heating ventilation and air conditioning (HVAC) from the motor vehicle 10. The ventilation duct port 44B is configured to align and operably couple with a ventilation or airflow duct 76 provided in the removable module 70B which in turn is operably coupled with an airflow outlet 74 at the rear end or the removable module 70B as seen in FIGS. 2B and 6. As such, the removable module 70B receives ventilation, heating and air conditioning, airflow from the HVAC system in the motor vehicle 10 and passes and outputs the airflow rearward of the module 70B, such as for directing the airflow towards the rearward seated passengers seated in the cabin interior 14 in the middle or rear rows of seating.

Figure 3:
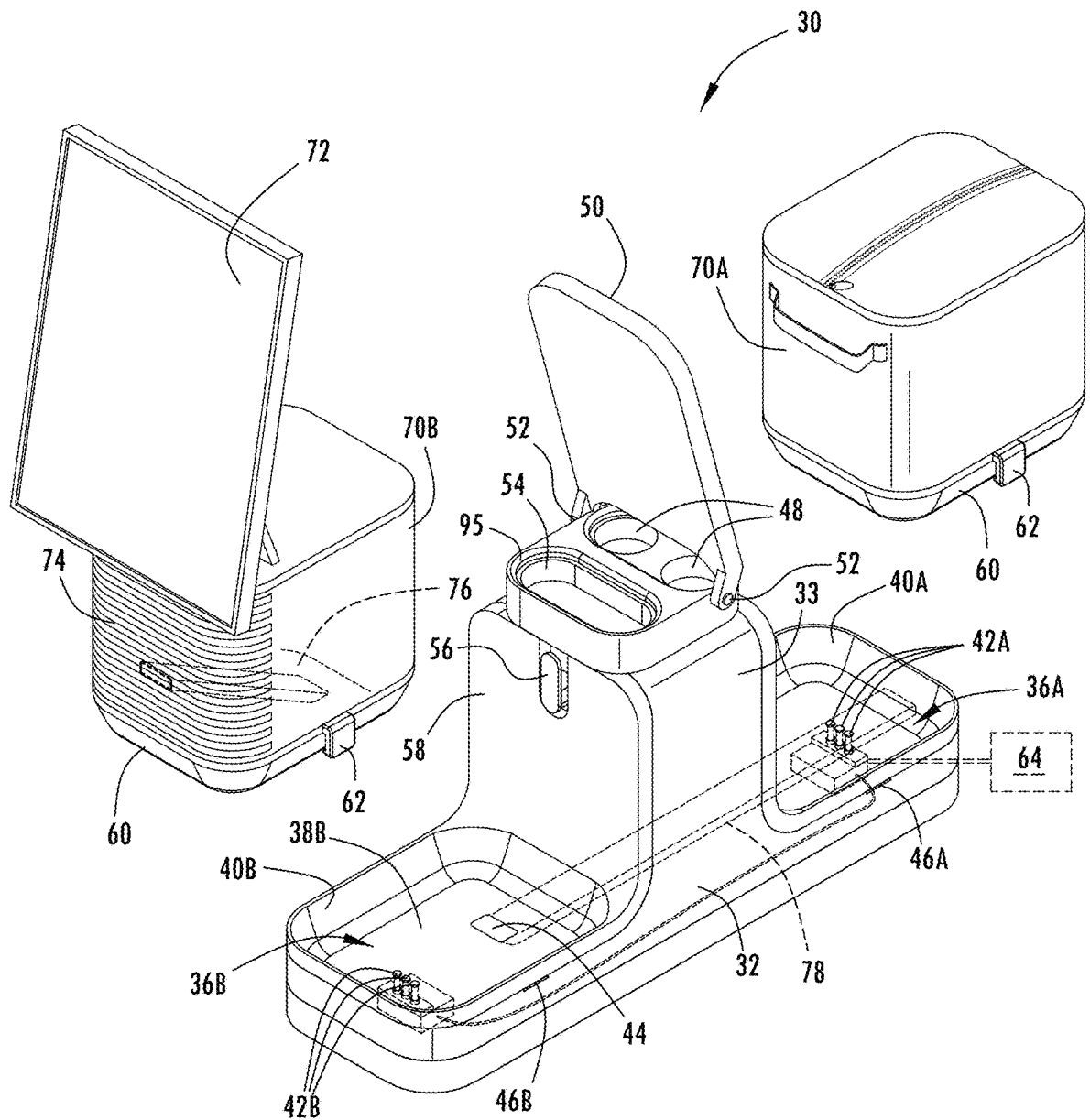
FIG. 3 is an enlarged exploded rear perspective view of the module center console illustrated in FIG. 2B.

Referring to FIGS. 2A, 2B and 3, the vehicle console 30 is generally shown having a first removable module 70A installed and fixedly attached to the first module holder 36A and a second removable module 70B shown installed and fixedly attached to the second module holder 36B. In this example, the first and second modules 70A and 70B may be selected from a group or a plurality of available modules 70A-70F shown in FIGS. 7A-7F. Each removable module 70A-70F is configured having a modular base 60 with securing clips and electrical contacts configured to engage the first and second module holders 36A and 36B. In the example shown, the first removable module 70A is a soft cooler module that provides a soft upper housing with thermal insulated walls for forming a cooler, and the second module 70B is a service module that includes a user input device in the form of a touchscreen display 72 that allows passengers as users to interact with services onboard the motor vehicle 10, for example.

Figure 5:
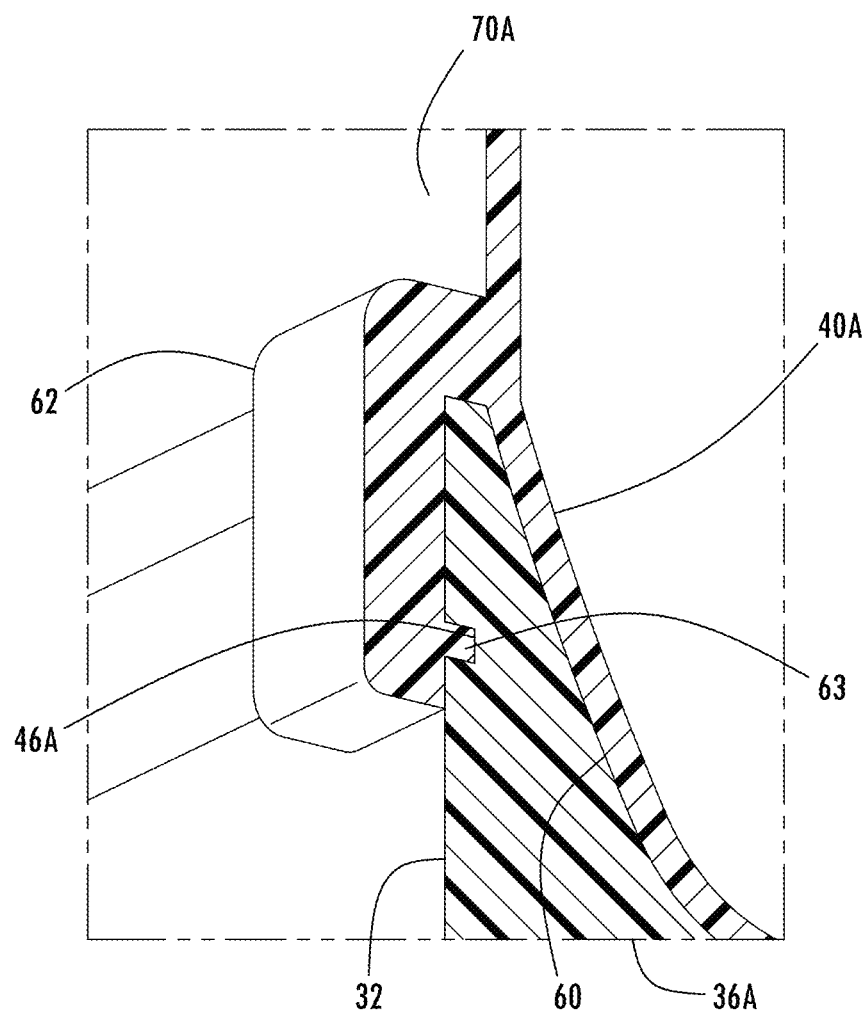
FIG. 5 is a cross-sectional view taken through line V-V of FIG. 4B showing the removable connection of the module onto the module holder, according to one example.

Referring to FIG. 5, the fixed connection of the removable module 70A on the module holder 36A is shown. The removable module 70A has a securing clip 62 which includes a resilient finger having an inward extending tooth 63. The tooth 63 is biased inward and configured to engage the retention detent 46A which is shown configured as a slot formed in the outer wall of the module holder 36A. As such, the tooth 63 engages the retention detent 46A with a bias force to hold the removable module 70A fixed in place. It should be appreciated that the retention detent 46B likewise receives a tooth on a securing clip to retain a removable module on the module holder 36B. It should be appreciated that a passenger may simply disconnect the securing clip 62 from engagement with the retention detents 46A or 46B by forcing the tooth 63 outward from the retention detent 46A to easily remove the module and replace the module with another module.

The vehicle console 30 generally includes an upstanding tower 33 extending upward between the first and second module housings 36A and 36B which may define a central storage compartment 54 on the interior and a pair of cup holders 40A near the front top end. The storage compartment 54 has a top access opening 95 that allows access to the compartment space. Extending over the access opening 95 of compartment 54 is a pivotable armrest lid 50 which in the rearward horizontal position covers the top access opening 95 of the storage compartment 54 and may serve as an armrest for the driver or passenger seated in the driver or passenger seat assemblies 20A and 20B, respectively. The armrest lid 50 is shown as a pivoting lid having pivot pins 52 on opposite lateral sides that allow the armrest lid 50 to pivot between the horizontal rearward position covering the access opening 95 of the storage compartment 54 as seen in FIG. 3, and an upstanding or forward rotated position that exposes the access opening 95 of the storage compartment 54.

The vehicle console 30 may further include a hanger 56 which is illustrated in FIG. 3, according to one example. The hanger 56 is generally formed on a rear upstanding wall of the tower 33 above the second module holder 36B and provides a hook upon which one or more items may be hung, such as a strap on a purse or grocery bags, for example. The hanger 56 is particularly useful when there is no module installed in the second module holder 36B. The hanger 56 is generally formed as an upstanding hook, according to the example shown. However, other hangers having other shapes and sizes may be employed. It should be appreciated that another hanger 56 may be provided on the front side above the first module holder 36A, according to another example.

Figure 4A:
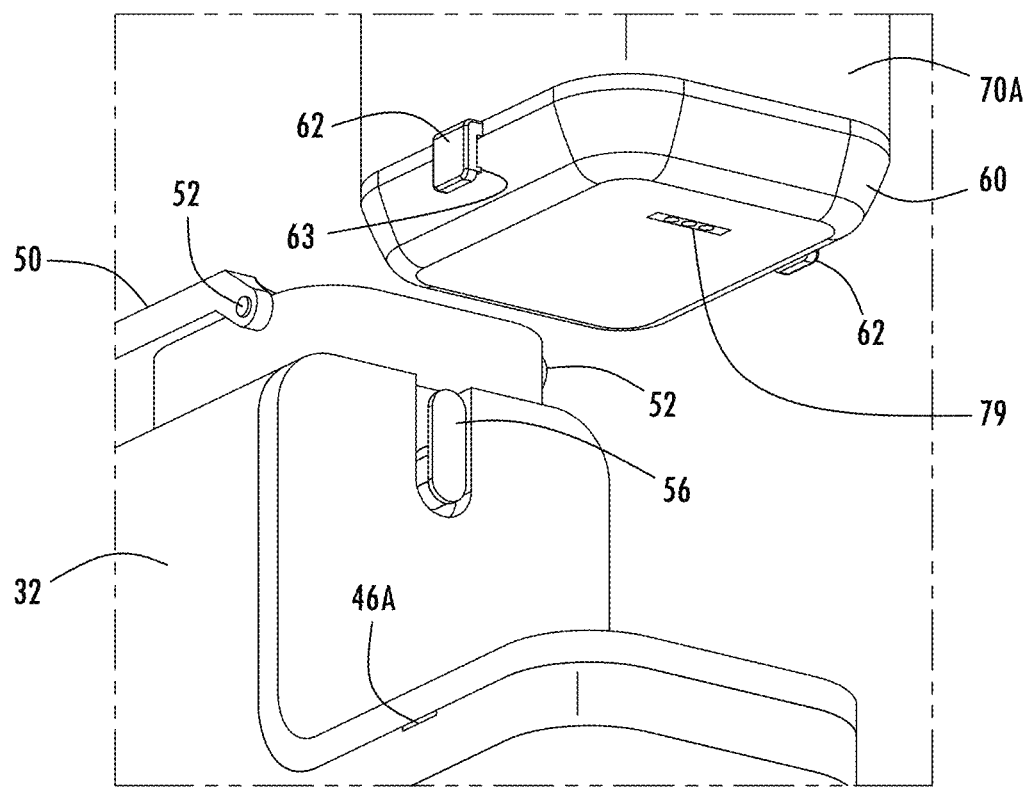
FIG. 4A is a lower rear perspective view of a module removed from the rear module holder of the modular center console shown in FIG. 3.
Figure 4B:
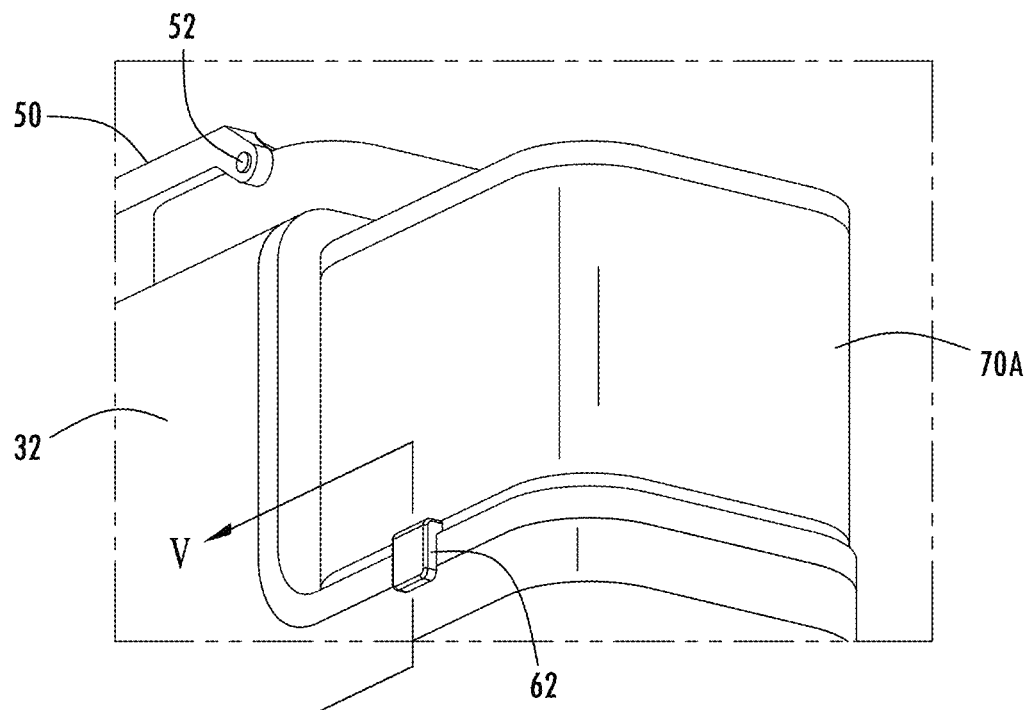
FIG. 4B is an enlarged lower rear perspective view of the module assembled onto the module holder as seen in FIG. 4A.

Referring to FIGS. 4A and 4B, the electrical contacts 79 on the bottom side of the base 60 of an exemplary removable module 70A are shown configured to align with and connect with the electrical contacts 42A or 42B on the respective module holder 36A or 36B shown in FIG. 3 to close circuit electrical circuitry to receive a supply of electrical power and allow data communication. It should be appreciated that the power and data communication electrical contacts shown in FIG. 3 may communicate via electrical circuitry 78 with a power and data control module 64. The electrical power may be supplied via power wires or wireless via induction, for example. The data communication may occur via wired or wireless communication such as Bluetooth®. This may enable the removable module retained in a module holder to power devices, such as a display, a cooling device, a heating device, media devices such as a gaming device, for example, or provide power and data communication outlets for connecting to other electronic devices, for example.

Figures 7A, 7B:
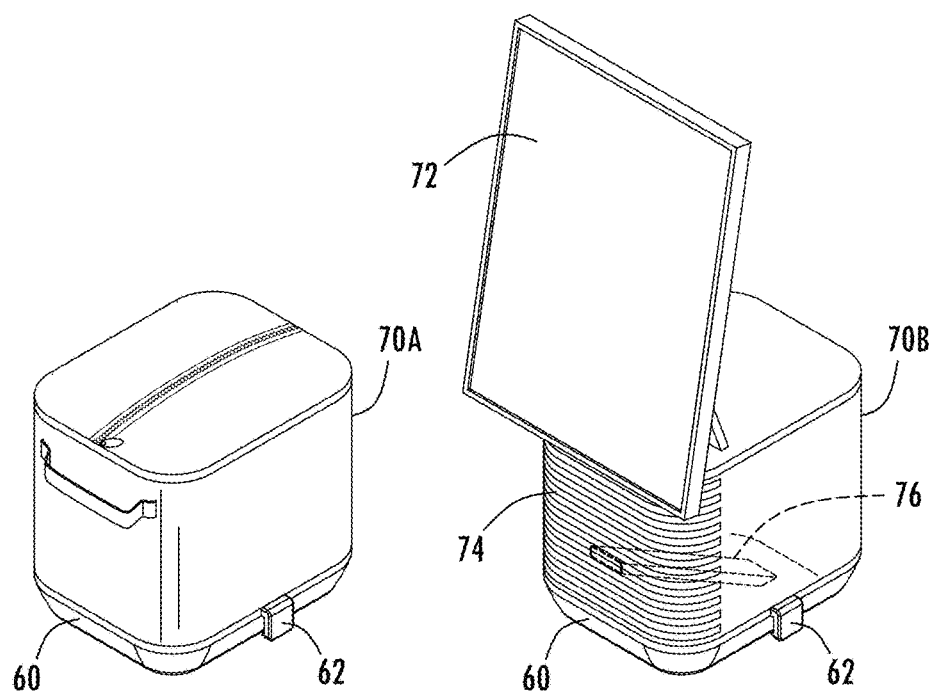
FIG. 7A is a perspective view of a removable ride share service module configured to be assembled onto the center console shown in FIG. 2A.
FIG. 7B is a perspective view of a removable soft cooler module configured to be assembled onto the center console shown in FIG. 2A.
Figures 7C, 7D:
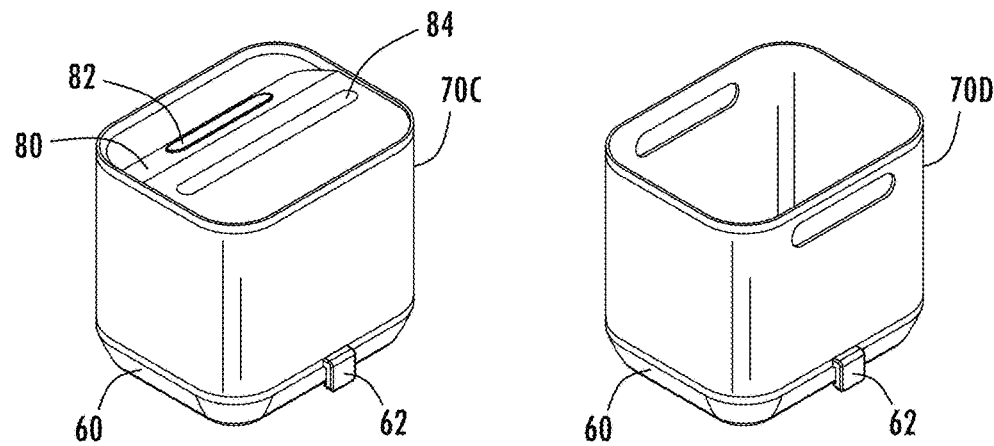
FIG. 7C is a perspective view of a removable biometric security lock box module configured to be assembled onto the center console shown in FIG. 2A.
FIG. 7D is a perspective view of a removable open storage module configured to be assembled onto the center console of FIG. 2A.
Figures 7E, 7F:
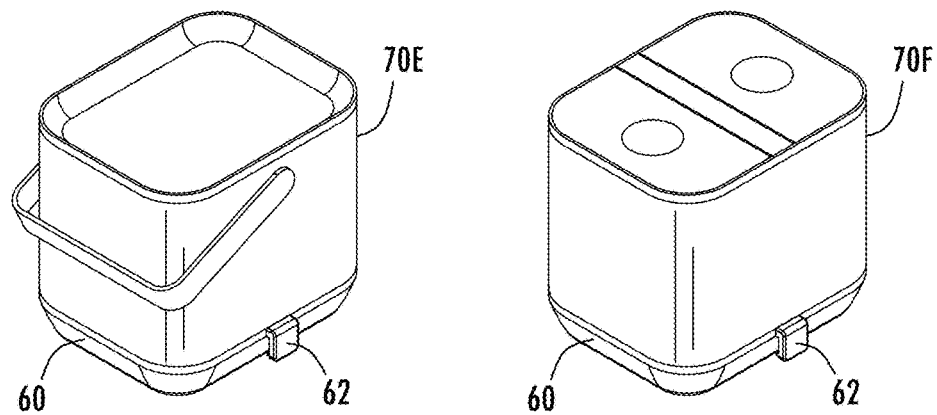
FIG. 7E is a perspective view of a removable wireless speaker module configured to be assembled onto the center console of FIG. 2A.
FIG. 7F is a perspective view of a removable trash bin module configured to be assembled onto the center console of FIG. 2A.

Referring to FIGS. 7A-7F, a plurality of selectable removable modules 70A-70F are illustrated, according to one example. It should be appreciated that the vehicle console 30 is configured to receive and retain any of the selected removable modules 70A-70F within either of the first and second module holders 36A and 36B. The group of selectable removable modules includes the first removable module 70A shown in FIG. 7A configured as a soft cooler module, which may have a soft upper wall and top and may include a zipper top or other closure. The first removable module 70A includes a rigid base 60 having a conforming shaped surface on the bottom that generally conforms to the shape of the module holder. The second selectable removable module 70B shown in FIG. 7B is configured as a service module generally having a display such as a touchscreen display 72 that serves as a user input and output human machine interface (HMI) device, and an airflow duct 76 and airflow outlet 74. A user may access or interface with the vehicle and associated electronics via the touchscreen display 72 to communication ride share information, vehicle service information, gaming information, and other forms of communication. The third removable module 70C shown in FIG. 7C is configured as a biometric security lockbox module. Module 70C is shown having a lid 80 on the top side with a handle 82 that may be grasped by the hand of a user. Included on the top side is a fingerprint sensor 84 which may optically scan the user's finger to look for a biometric fingerprint match and may have an actuator to open the security lockbox when the biometric match occurs. The fourth removable module 70D is shown configured as an open storage module in FIG. 7D. The open storage module 70D generally includes a somewhat rectangular container having an open top end. The fifth removable module 70E shown in FIG. 7E is configured as a wireless speaker module which may employ wireless communication to communicate with an electronic device and broadcast audio sound. The wireless communication may include Bluetooth® communication or other forms of wireless communication available onboard the motor vehicle. The sixth removable module 70F shown in FIG. 7 is configured as a trash bin module which may include a lid on top covering a trash compartment in the closed lid position, according to one example.

It should be appreciated that any of the removable modules 70A-70F may be selected and assembled onto and removably connected to either of the first and second module holders 36A and 36B. It should further be appreciated that the first and second module holders 36A and 36B may each include the airflow duct and the electrical contacts shown in module 70B. The replaceable modules 70A-70F may or may not include each of the airflow duct outlets and electrical contacts, depending on the features provided on each individual removable module. For example, the second removable module 70B shown in FIG. 7B has an airflow duct 76 and airflow outlet 74, whereas other of the removable modules do not include airflow ducts passing therethrough. Similarly, the second removable module 70B has electronics related to the display and other possible electronics, whereas other of the removable modules may or may not require a power and data communication connection. It should further be appreciated that other types of removable modules having various other features may be employed in the vehicle console 30, according to other examples.

Vehicle Service Console

Referring to FIGS. 8A-10, a vehicle console 130 is illustrated according to a second embodiment. The vehicle console 130 is shown as a center console positioned in the space between the driver seat assembly 20A and passenger seat assembly 20B in the front row of the motor vehicle 10. In the example shown, the vehicle console 130 employs a swappable housing 132 that may connect to and disconnect from a base 134 and provides various service features that may be useful for vehicle services such as ride share services, delivery vehicle services, and providing or performing other services such as purchasing or obtaining items from a vending compartment showcase, acquiring cleaning items, such as for example disinfecting the motor vehicle 10 after use or before use, providing payment and advertising features, and other service related features.

The vehicle console 130 includes a housing 132 removably connected to an underlying base 134. The base 134 is fixedly connected to the vehicle floor 18 or other support structure in the motor vehicle 10 with connectors which may include fasteners such as bolts or screws, or via welding and other connectors, for example. Accordingly, the housing 132 is equipped with various console features and may be detached and disassembled from the base 134 and may be swapped out with another console housing.

The vehicle console 130 has a plurality of compartments for providing storage space for storing one or more items. For example, a tray 120 is provided on the front end of the housing 132 which may be defined on a periphery by an upstanding wall. Disposed on top of the tray 120 is a removable tray 122 which is shown having a generally rectangular configuration, according to one example. The tray 120 and the removable tray 122 disposed on top thereof may hold one or more items.

Figure 8A:
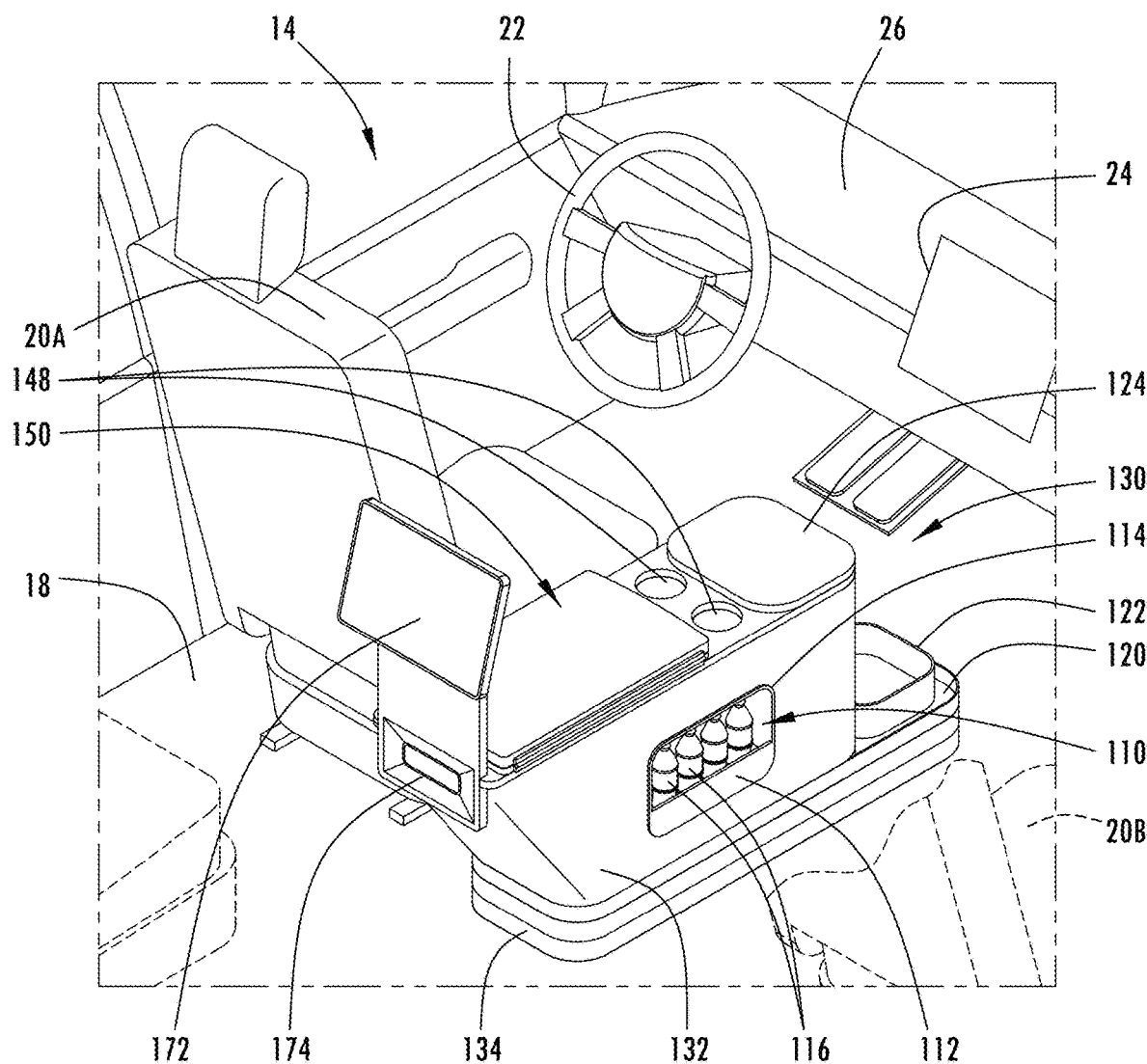
FIG. 8A is a rear perspective view of a second embodiment of a center console having a swappable base housing.
Figure 8B:
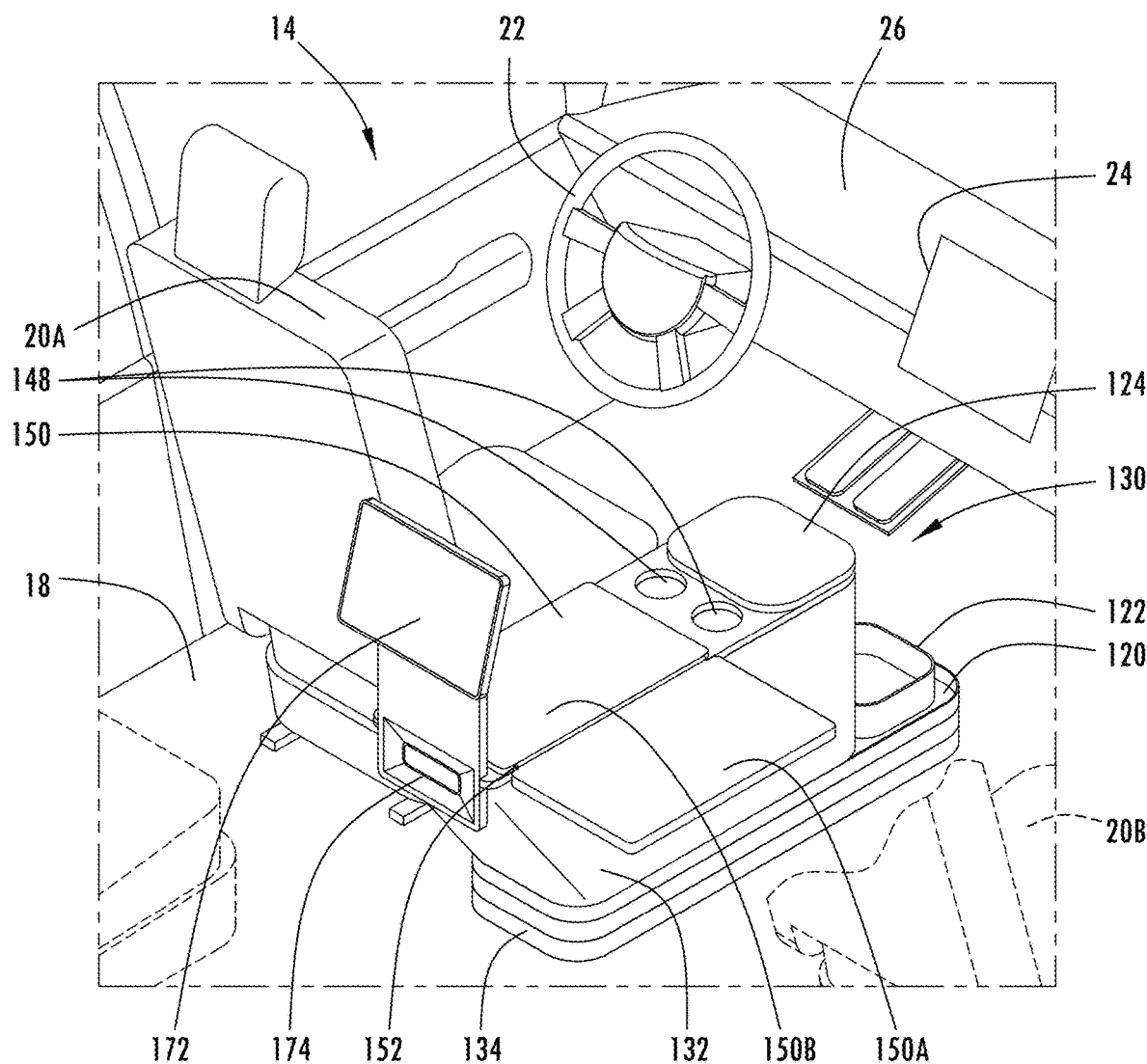
FIG. 8B is a rear perspective view of the center console shown in FIG. 8A with the armrest lid in a deployed table position, according to one example.
Figure 8C:
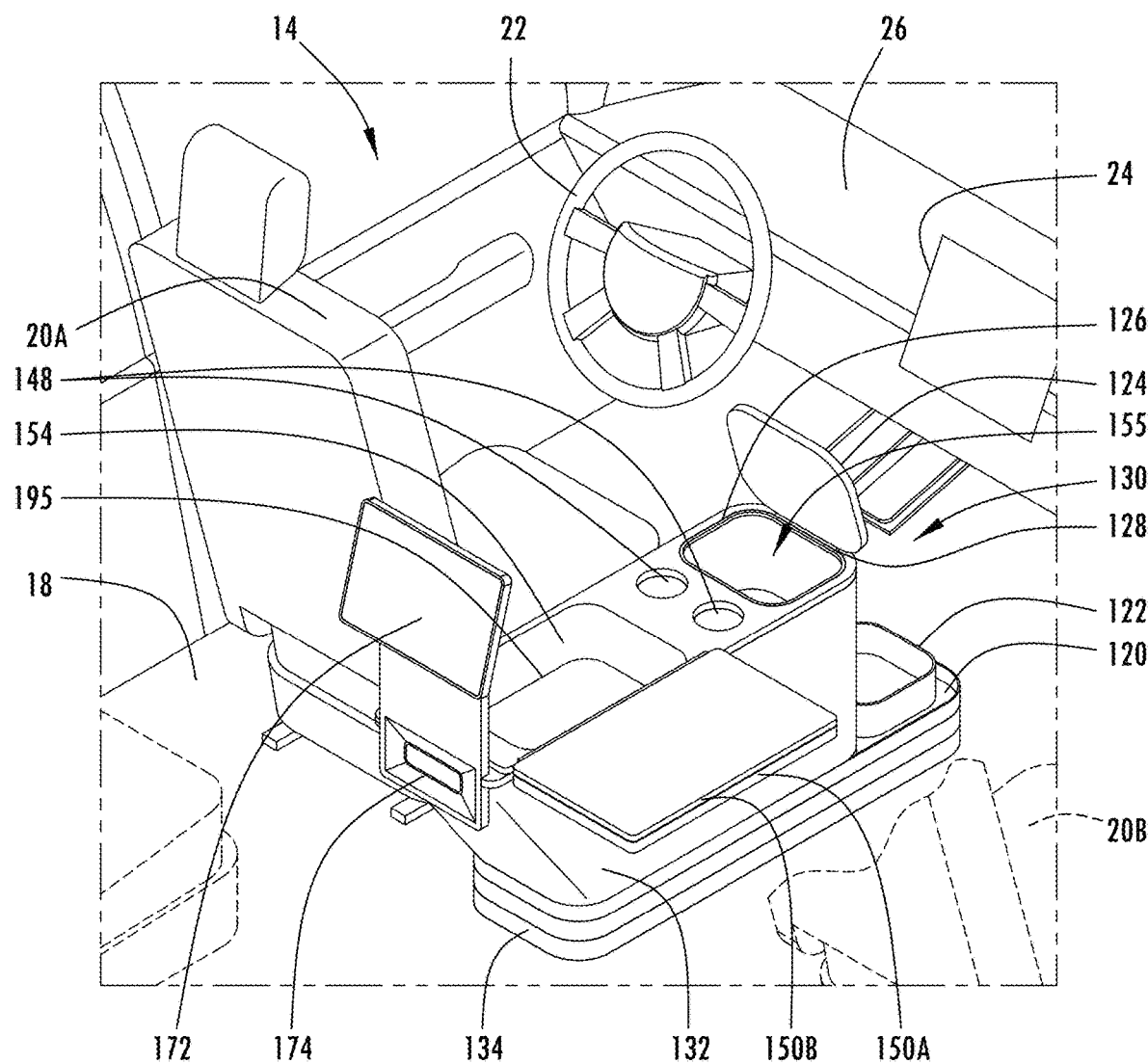
FIG. 8C is a rear perspective view of the center console shown in FIG. 8A with the armrest lid further positioned in an open lid position.

The vehicle console 130 further includes a main storage compartment 154 with an access opening 195 on the top rear end. The access opening 195 is shown in FIG. 8A covered by an armrest lid 150 which serves as a lid and an armrest and also serves as a deployable worktable. The armrest lid 150 includes a first table 150A integrally connected via one or more hinges 152 to a second table 150B. In FIG. 8A, the armrest lid 150 is shown in a fully stowed folded position and covering the access opening 195 to the main compartment 154. The first table 150A is configured to pivot outward about the one or more hinges 152 on one lateral side of the access opening 155 as seen in FIG. 8B to provide an expanded area worktable made up of both the first and second tables 150A and 150B. In addition, the second table 150B may further be rotated and folded about the one or more hinges 152 outward to uncover the access opening 195 for the main compartment 154. In this open lid position, the second table 150B provides a reduced size worksurface.

The vehicle console 130 further includes another compartment 155 vehicle forward of the main compartment 154 that may act or may serve as a garbage container, according to one example. The garbage container configuration may include a base 180 disposed within the bottom surface of the compartment 155 and a rim or bezel 126 located on the top surface along a perimeter of the top access opening 195 which is configured to receive and hold a liner for a garbage bag in place. Pivotally connected to the bezel 126 is a lid 124 which is connected via one or more hinges 128 that may open and close the lid 124 to allow access or closure to the garbage container configured compartment 155.

The housing 132 further includes a vending compartment 110 shown configured on one lateral side which provides a showcase for obtaining, such as purchasing, items held in the showcase. The vending compartment 110 includes an opening for accessing the vending compartment from the lateral side and has a lower wall 112 to hold items in place and an open upper window 113 to expose the items for presentation and access. Accordingly, a passenger in the motor vehicle 10 may access one or more items from the vending compartment 110. It should be appreciated that while a vending compartment 110 is shown on one lateral side of the housing 132, another vending compartment may likewise be located on the opposite lateral side of the housing 132 and other vending compartments may be located on the front and/or rear ends of the housing 132, according to other examples.

The housing 132 further includes a pair of cupholders 148 shown provided on the top surface between the main compartment 154 and the garbage container compartment 155. It should be appreciated that various other compartments may be provided on or in the housing 132 with various shapes and sizes, according to other examples.

Connected at the rear end of the center console 130 is a human machine interface (HMI) that may operate as a user input device and user output device shown in the form of a touchscreen display 172. The touchscreen display 172 may be integrally formed or attached to or proximate the rear end of the housing 132 and generally faces vehicle rearward towards the rearward row of seating. As such, passengers seated in the middle second row of seating may view and access the touchscreen display 172 to input data and commands and to view or otherwise receive output data or information. For example, a passenger may interact with the touchscreen display 172 to obtain, such as purchases, one or more items from the showcase or compartments on the vehicle, such as to purchase an item on a ride share service vehicle, for example.

In addition, an airflow duct outlet 174 is provided at the rear end of the housing 132 to provide airflow such as HVAC airflow, rearward towards the middle second row of seating. It should be appreciated that the airflow duct outlet 174 is operably coupled to an airflow duct 176 that extends through the housing 132 as shown in FIG. 10 and operably couples to an airflow duct 178 that is incorporated into the heating, ventilation and air conditioning (HVAC) system of the motor vehicle 10.

Figure 9:
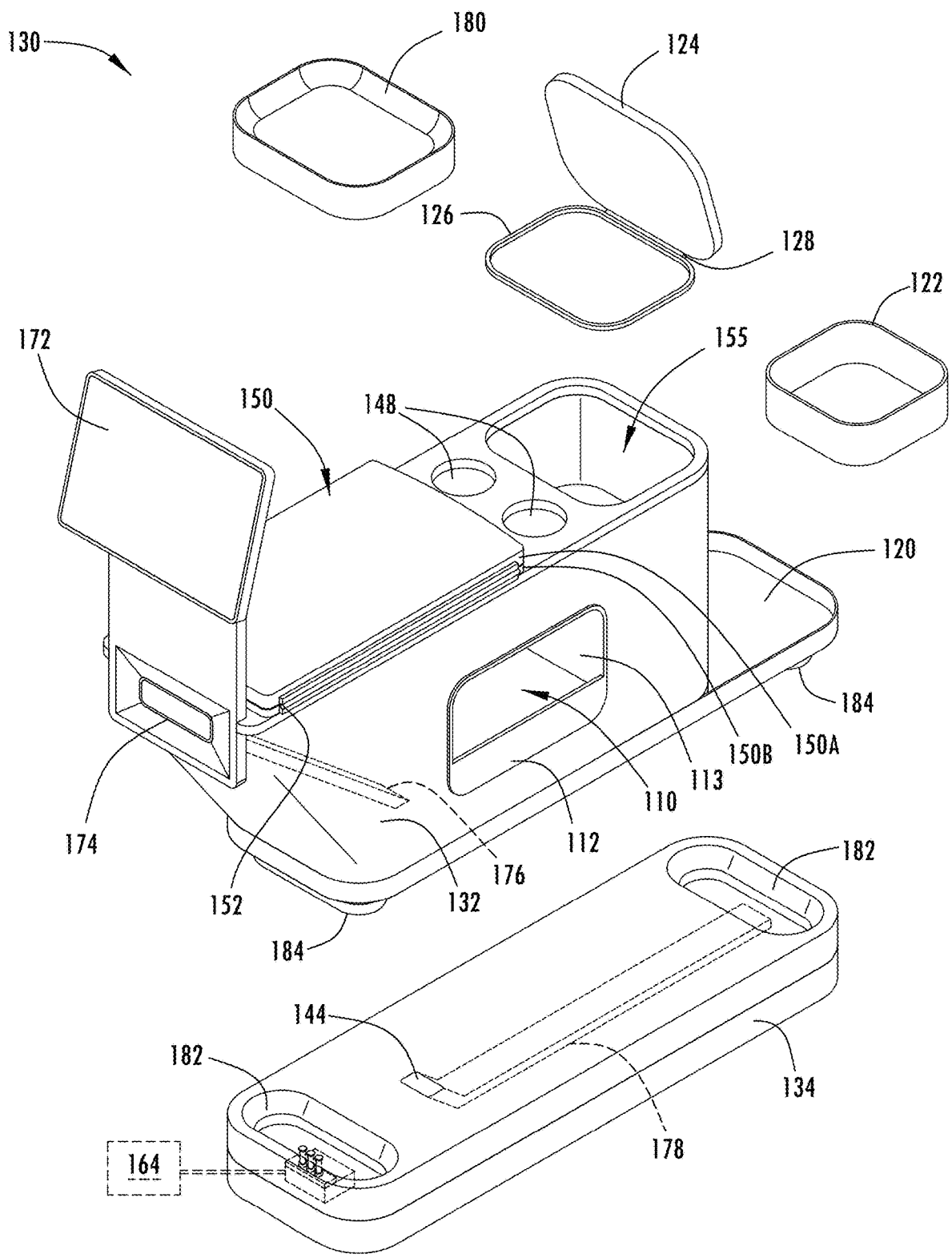
FIG. 9 is an enlarged exploded rear perspective view of the center console illustrated in FIG. 8A.
Figure 10:
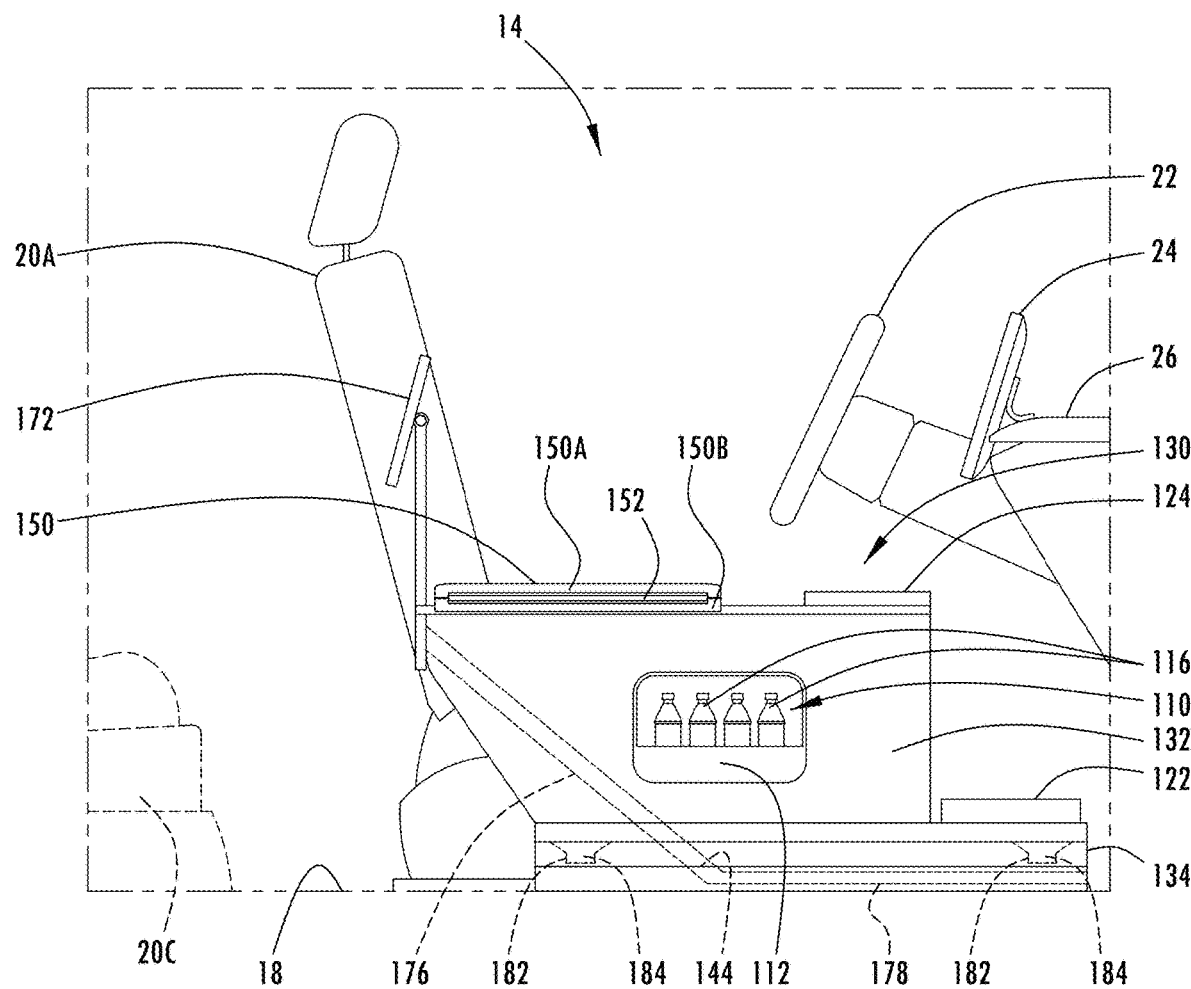
FIG. 10 is a schematic side view of the center console illustrated in FIG. 8A.

Referring to FIGS. 9 and 10, the swappable connection of the housing 132 onto the base 134 is further illustrated, according to one example. The base 134 is shown having a pair of female connectors 182 formed on opposite front and rear ends. The bottom of the housing 132 has a pair of male connectors 184 configured with a shape and size to extend into and engage the female connectors 182 to lock the housing 132 onto the base 134. The connection of the female and male connectors 182 and 184 may include a snap-lock connection or a twist-lock connection, for example, which is removable. As such, a user may remove a housing 132 from the base 134 and may swap the housing 132 out for a different housing simply by disconnecting the housing 132 from the base 134 and attaching the replacement housing to the base 134. This removable connector arrangement provides for a swappable center console on the motor vehicle 10.

Road Trip Console

Referring to FIGS. 11A-13, a vehicle console 230 is illustrated on the motor vehicle 10 according to a third embodiment. The vehicle console 230 is shown configured as a center console located in the space between the driver seat assembly 20A and the passenger seat assembly 20B in the front row of seating of the motor vehicle 10. The vehicle console 230 is configured with various features that enable portability with vehicle road trips and allow for a housing of the vehicle console 230 to be swapped out for a different or replacement console housing, according to one example. The vehicle console 230 includes a base 234 fixedly connected to the vehicle floor 18 or other supporting structure. The connection of the base 234 to the vehicle floor 18 may be achieved with the use of fasteners, such as screws or bolts, or may include welding, for example. As such, the base 234 is intended to be fixed in place on the vehicle floor 18 while the remainder of the vehicle console 230 may be swapped out in this example.

Figure 11A:
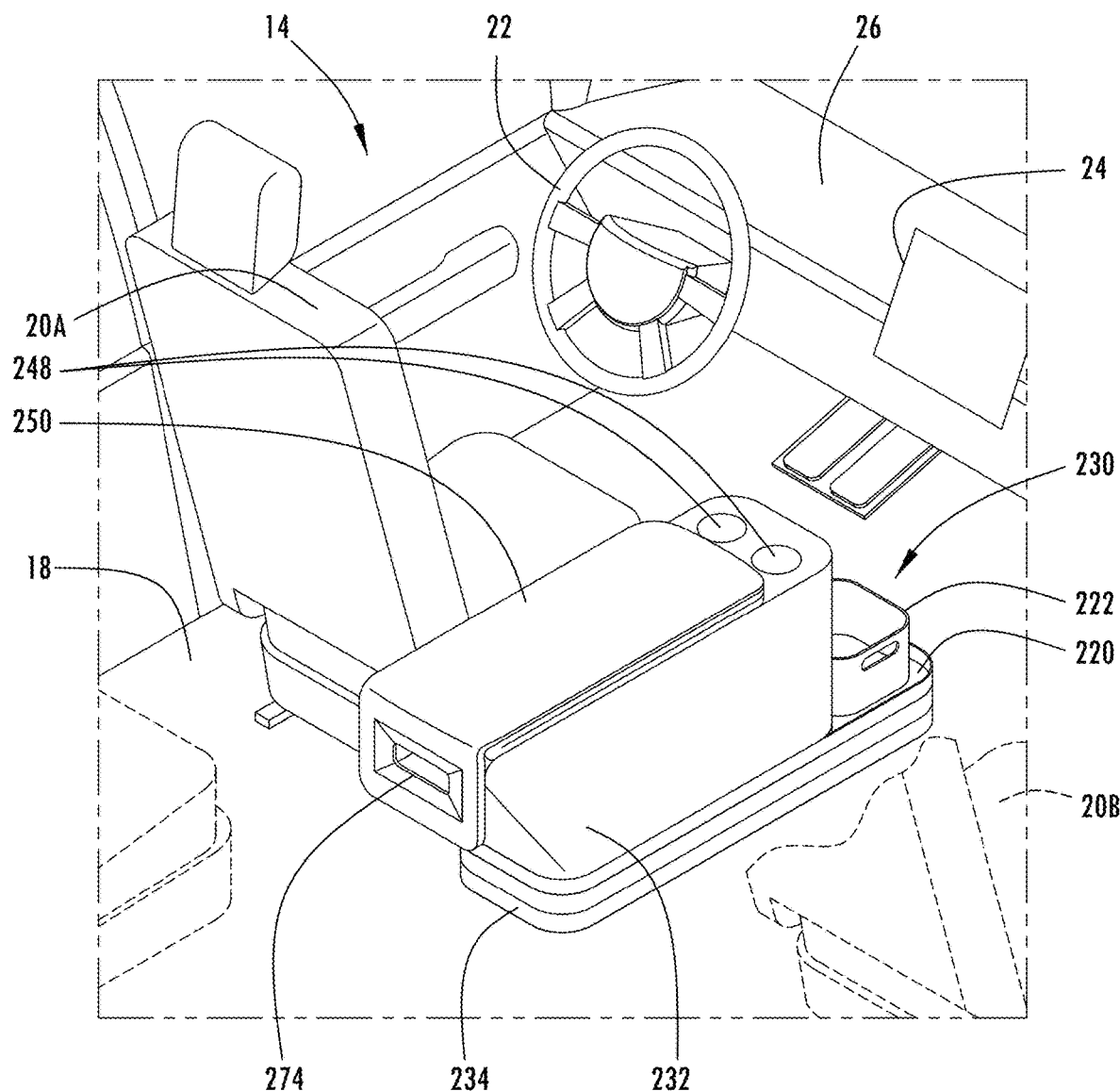
FIG. 11A is a rear perspective view of a third embodiment of a center console having road trip features and accessories.
Figure 11B:
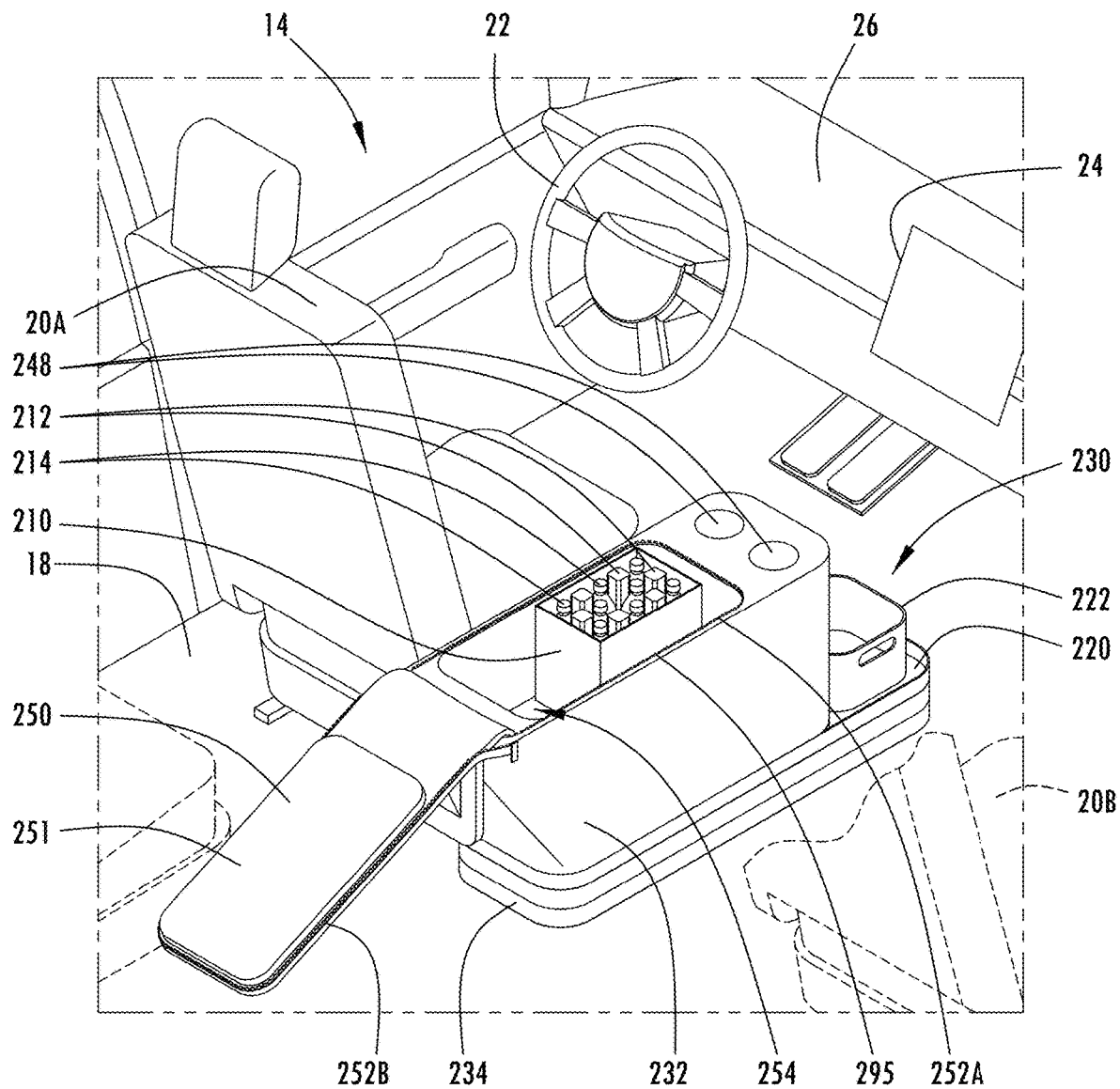
FIG. 11B is a rear perspective view of the center console illustrated in FIG. 11A with the armrest lid in an open lid position.
Figure 12:
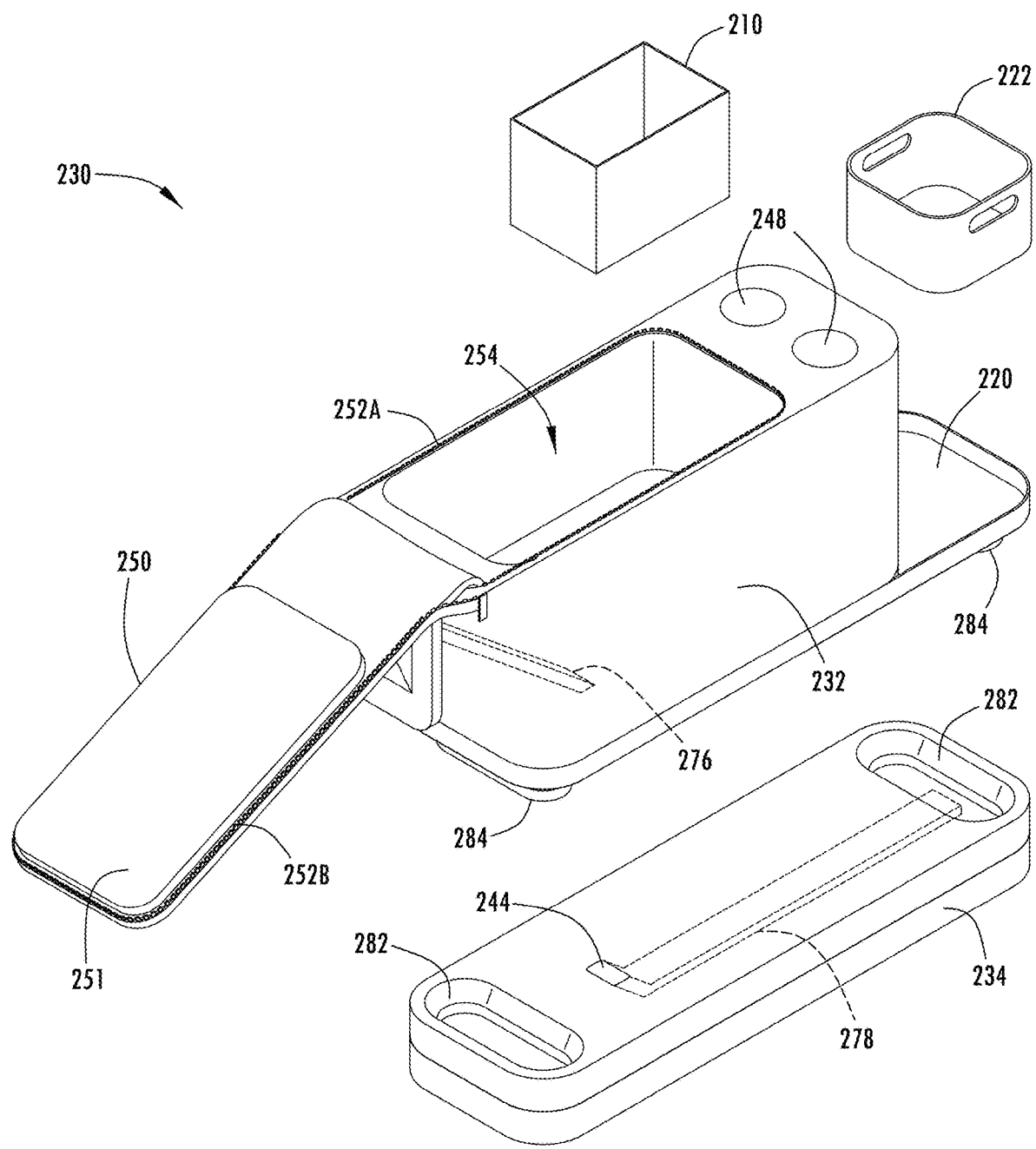
FIG. 12 is an enlarged exploded rear perspective view of the center console shown in FIG. 11B with the armrest lid in the open console position.

Removably connected to the top side of the base 234 is a housing 232. The housing 232 is configured to be removable and may be swapped out with a replacement housing on top of the base 234. The housing 232 may include various compartments for holding and storing items. For example, the vehicle console 230 has a main storage compartment 254 with an access opening 295 on the top side thereof. The main compartment 254 is shown having a generally rectangular or cube-shaped configuration. Disposed on top of the housing 232 and covering the access opening 295 of the main compartment 254 is a flexible armrest lid 250 which may cover the access opening 295 of the main compartment 254 as seen in FIG. 11A or may be opened to expose and allow access to the main compartment 254 in FIG. 11B. The main compartment 254 may include an insulated compartment having thermal insulated walls, such as walls reinforced with foam insulation or other thermal insulation. The armrest lid 250 likewise may include thermal insulation 251, such as foam insulation or other insulation. As such, the main compartment 254 is configured in this example to operate as a thermally insulated container such as a cooler to keep items stored therein thermally isolated with low heat exchange from the surrounding environment.

The armrest lid 250 is configured with a zipper that is made up of a first zipper piece 252A operatively coupled to a second zipper piece 252B. The first zipper piece 252A extends around a perimeter of the access opening 295 of the main compartment 254 on top of the housing 232. The second zipper piece 252B extends around the perimeter of the armrest lid 250. The first zipper piece 252A is matingly engaged to the second zipper piece in the closed lid position and may be unzipped to open up the compartment 254 by separating the first zipper piece 252A from the second zipper piece 252B with a sliding motion. As such, a plurality of teeth of the first and second zipper pieces 252A and 252B are engaged and locked together when the armrest lid 250 is in the closed lid position.

Disposed within the main compartment 254 is a container having walls defining a compartment shown as a cooler insert container 210. The cooler insert container 210 may be portable and insertable into and removable from the main compartment 254 and may be fixed in place with releasable fasteners. The cooler insert container 210 is shown having a plurality of ice packs 212 which may be arranged and spaced to provide openings for receiving items, such as drink containers 214. As such, the ice packs 212 operate to thermally cool the drink containers 214, in the example shown. As such, the cooler insert container 212 may be disposed within the main compartment 254 and the first and second zipper pieces 252A or 252B may be zipped closed to close the armrest lid 250 to provide for an insulated cooler surrounding the cooler insert container 210. As such, passengers in the motor vehicle 10 may access thermally cooled beverages or other cooled items.

Figure 13:
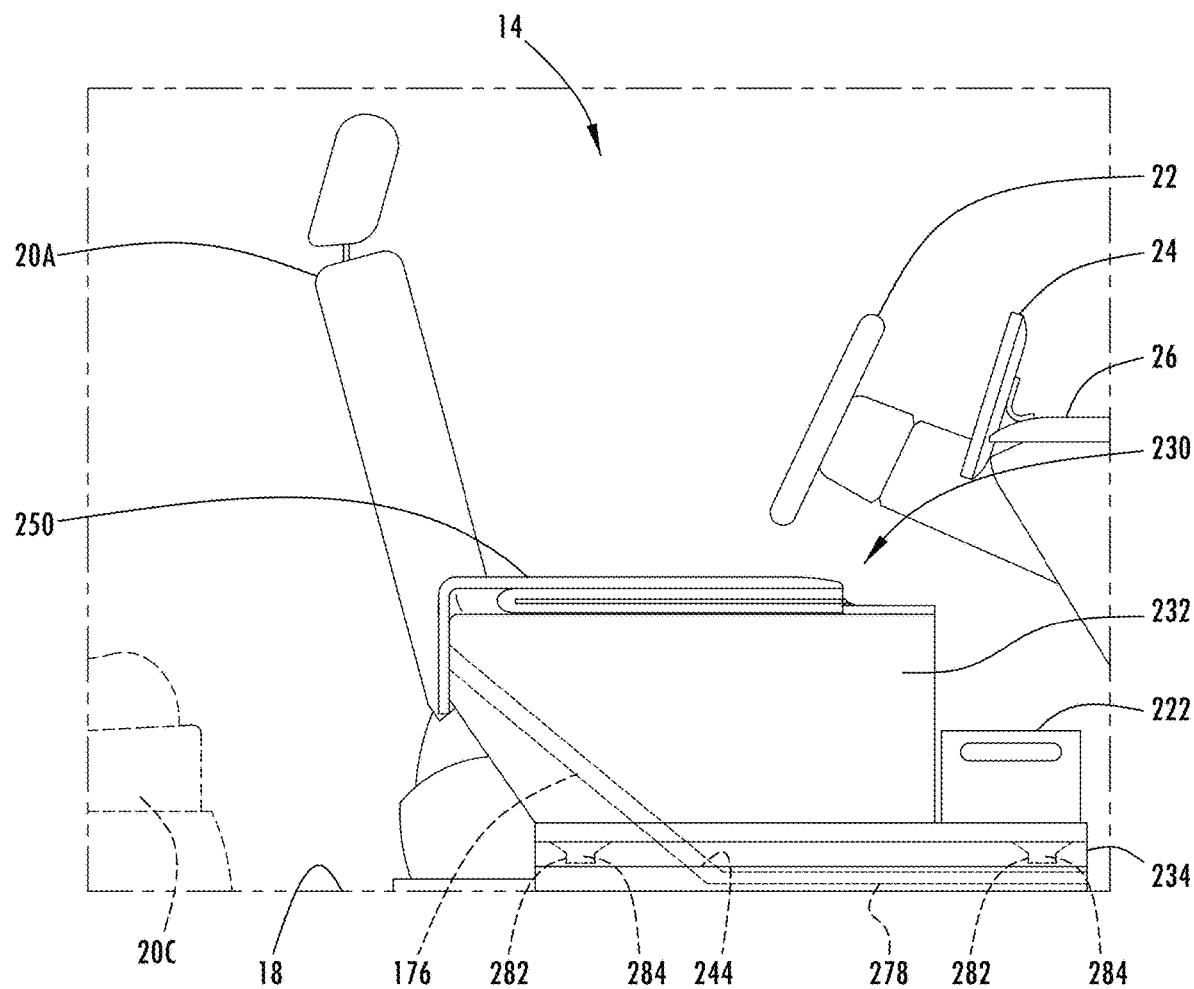
FIG. 13 is a schematic side view of the center console shown in FIG. 11A.

In addition, the housing 232 includes a pair of drink holders 248 on a top surface at a forward end thereof and an airflow duct outlet 274 at the rear end thereof. The airflow duct outlet 274 may be operatively coupled to an airflow duct 276 extending through the housing 232 as seen in FIG. 13. The airflow duct 276 may, in turn, be operatively coupled to a vehicle airflow duct 278 that transfers air from the vehicle heating, ventilation and air conditioning (HVAC) system. As such, HVAC airflow is able to flow out the airflow outlet 274 at the rear end of the vehicle console 230 and into the cabin interior 14.

The vehicle console 230 further includes a tray 220 generally defined by an upstanding peripheral wall extending forward at the front end of the housing 232. Disposed on the tray 220 is a removable tray 222 which may include a pair of handles and may rest on top or be fixedly attached to tray 220. As such, additional items may be held on the tray 220 and the removable tray 222.

The base 234 has a pair of female connectors 282 at opposite front and rear ends thereof. The bottom of housing 232 has a pair of male connectors 284 which extend into the female connectors 282 as seen in FIG. 13. The male connectors 284 may engage the female connectors 282 in a snap-fit configuration or a twist-lock configuration to lock the housing 232 onto the base 234. As such, a passenger or use may unsnap or twist the housing 232 to remove it from the base 234 and may swap the housing 232 out for a different housing and connect it to the base 234. Accordingly, the vehicle console 230 advantageously provides for a vehicle console having a cooler for vehicle road trips. The housing 232 of the center console 230 may be swappable by replacing the housing 232 with a replacement housing.

Media Console

Referring to FIGS. 14A-17, a vehicle console 330 is illustrated according to a fourth embodiment. The vehicle console 330 is shown in this embodiment as a vehicle center console arranged in the space between the driver seat 20A and the passenger seat 20B in the front row of seating of the motor vehicle 10. The vehicle console 330 is generally located vehicle rearward of the front display device 24 which is shown assembled on the dashboard 26, in this example. The vehicle console 330 includes a base 332 fixedly connected to a supporting structure on the motor vehicle 10, such as the vehicle floor 18. The base 332 may be connected to the vehicle floor 18 via fasteners, such as bolts or screws, or may be welded to the vehicle floor 18, for example. The vehicle console 330 further includes a housing 334 removably connected to the top surface of the base 332. In one example, the housing 334 may be swappable with a replacement housing by disconnecting a snap-fit connection or a twist-lock connection and reinserting a new console housing onto the base 332.

Figure 14A:
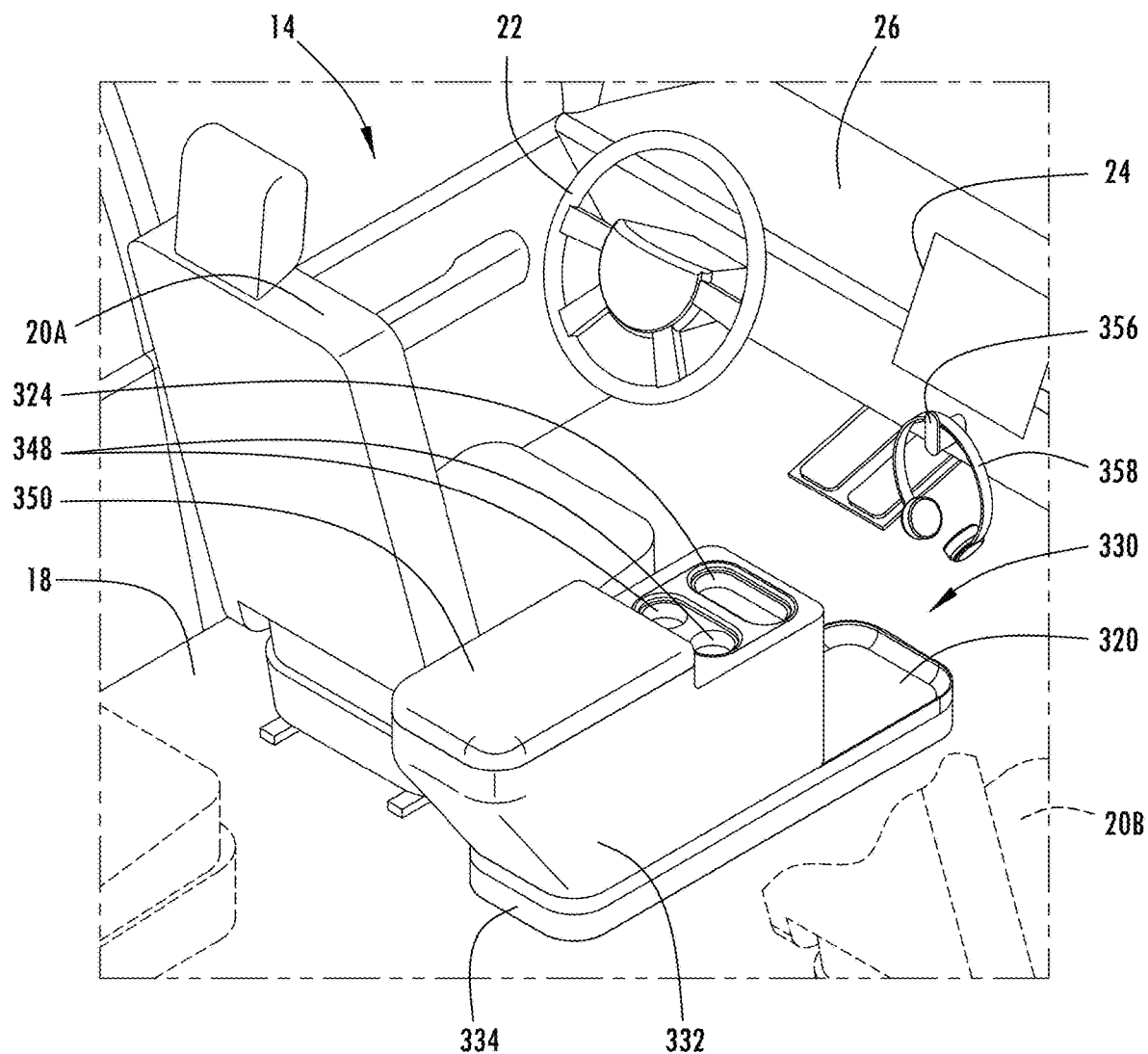
FIG. 14A is a rear perspective view of a fourth embodiment of a center console equipped with media features and accessories.
Figure 14B:
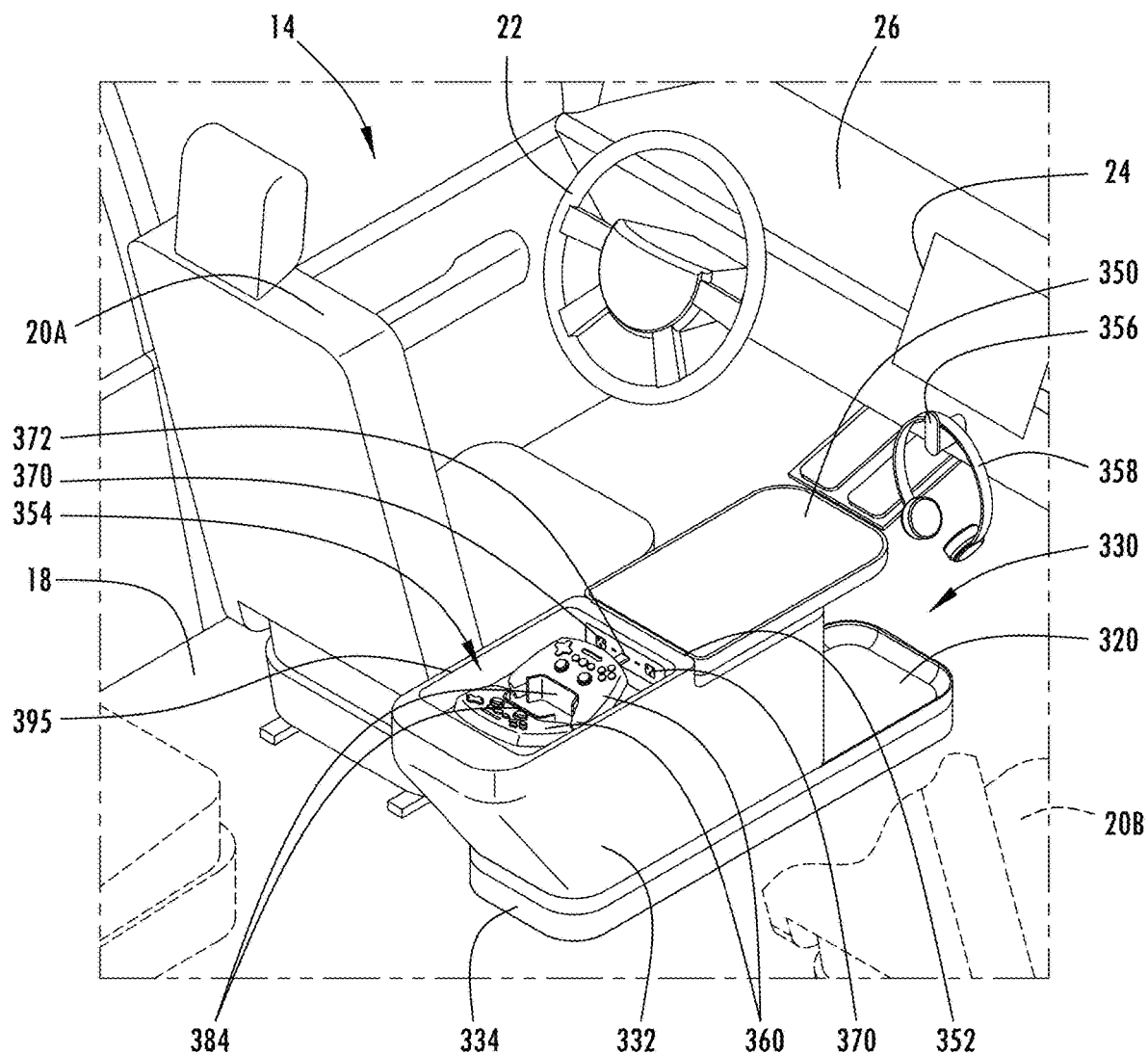
FIG. 14B is a rear perspective view of the center console illustrated in FIG. 14A with the armrest lid in the open lid position.

The housing 334 generally defines a plurality of compartments that may be used as storage compartments to store one or more items onboard the motor vehicle 10. The housing 332 includes a main compartment 354 having a top access opening 395 to allow access to the main compartment 354. An armrest lid 350 is shown pivotally connected to the top side of the housing 332 to close the access opening 395 in a closed lid position as seen in FIG. 14A and to pivot to an open forward position to expose the access opening 395 of the main compartment 354 as seen in FIG. 14B. It should be appreciated that the armrest lid 350 may be hingedly connected via one or more hinges 352 along the top forward edge of the access opening 395 on the housing 334 adjacent to the access opening 395 of the main compartment 354. The armrest lid 350 may also serve also as an armrest having a cushioned top surface in the closed lid position shown in FIG. 14A. Further, the armrest lid 350 may serve as a table in the forward rotated open position as seen in FIG. 14B.

Figure 14C:
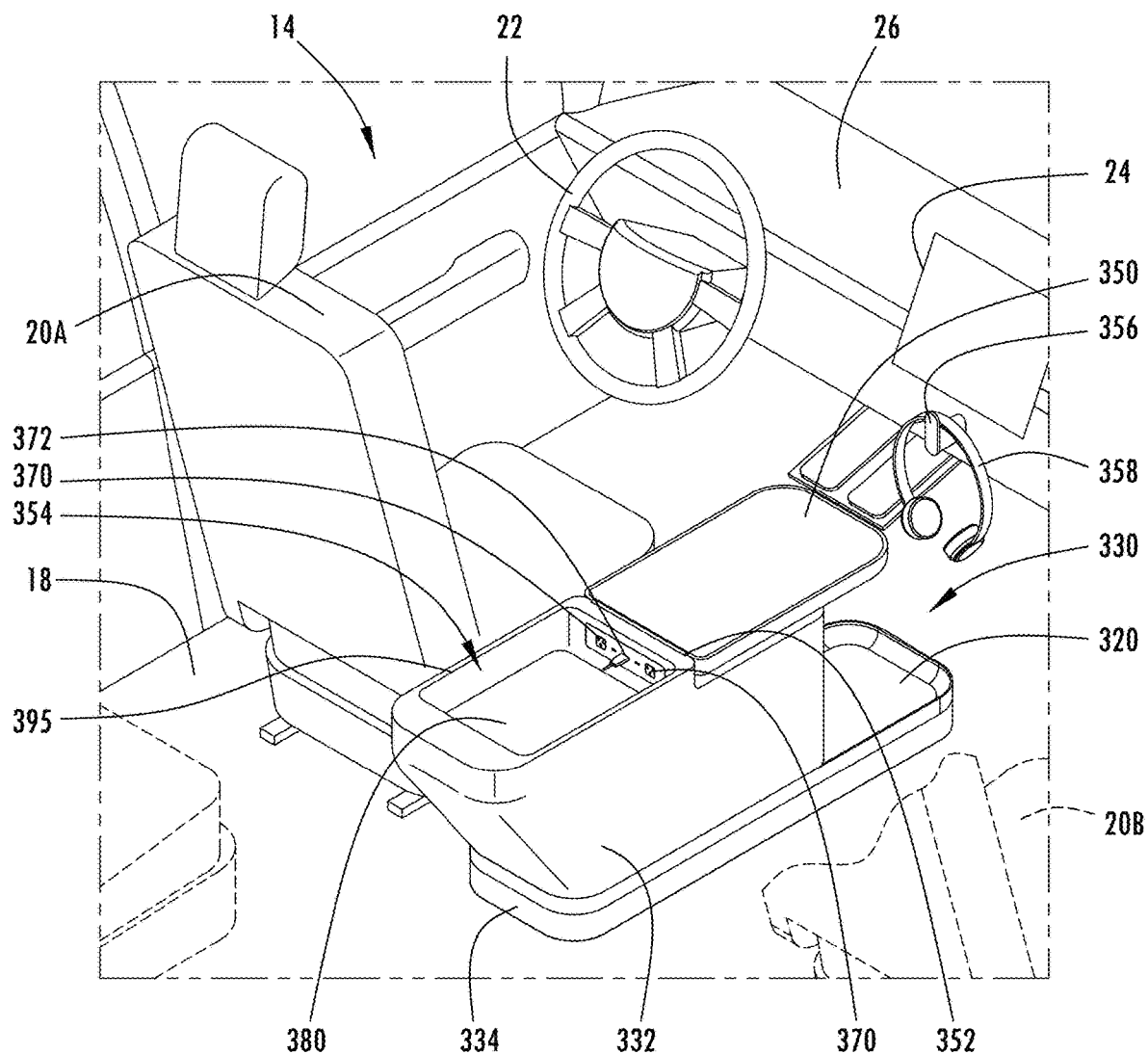
FIG. 14C is a rear perspective view of the center console illustrated in FIG. 14B with an armrest lid in the open lid position and the media storage compartment empty.
Figure 14D:
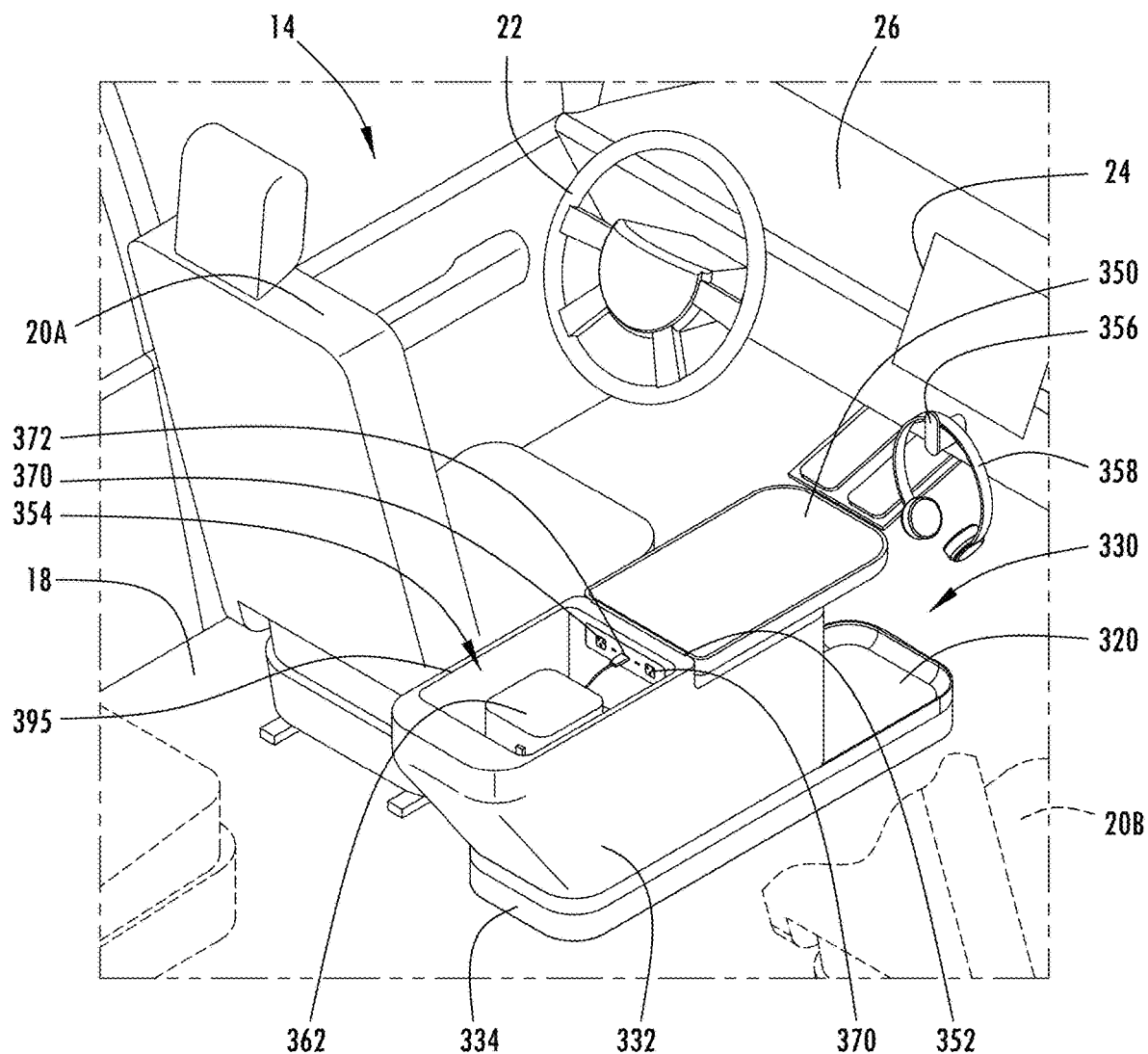
FIG. 14D is a rear perspective view of the center console illustrated in FIG. 14A with a media accessory located in the media storage compartment.

Disposed within the main compartment 354 are a plurality of power and data communication outlet ports. As seen in FIG. 14C, included are a plurality of electrical outlets 370 are provided on the inner wall of the main compartment 354 for supplying electrical power to power one or more electrically powered devices. The electrical outlets 370 may provide direct current (DC) voltage electrical power supplied by the vehicle battery, or the DC power may be converted to provide an alternating current (AC) voltage. It should be appreciated that the outlets 370 may be configured with standard power connectors for receiving a plug with terminals to receive the electrical power. In addition, one or more data ports 372 are also provided on the inner wall of the main compartment 354. The data ports 372 may include one or more USB connector ports, for example, or other data communication ports such as phone or computer connection ports. As such, one or more electrically powered and/or data communication devices may be stowed within the main compartment 354 as shown in FIGS. 14B and 14D and may be plugged into one or more of the power or data ports 370 or 372 to be powered and/or to be charged and/or communicate data.

As seen in FIG. 14B, a couple of electronic media devices in the form of game controllers 360 are shown stowed in the main compartment 354, according to one example. The game controllers 360 may be electrically powered and/or charged by plugging electrical cables into the power ports 370. In addition, the game controllers 360 may be connected to electrical cables to provide data communication with the communication ports 372 to play video games or communicate other data. As seen in FIG. 14D, a game control module 362 is shown disposed within the main compartment 354. The game control module 362 may likewise be connected to one or more of the power ports 370 to power or charge the game control module 362 and may provide data communication with the motor vehicle 10 via one or more of the data communication ports 372.

Figure 15:
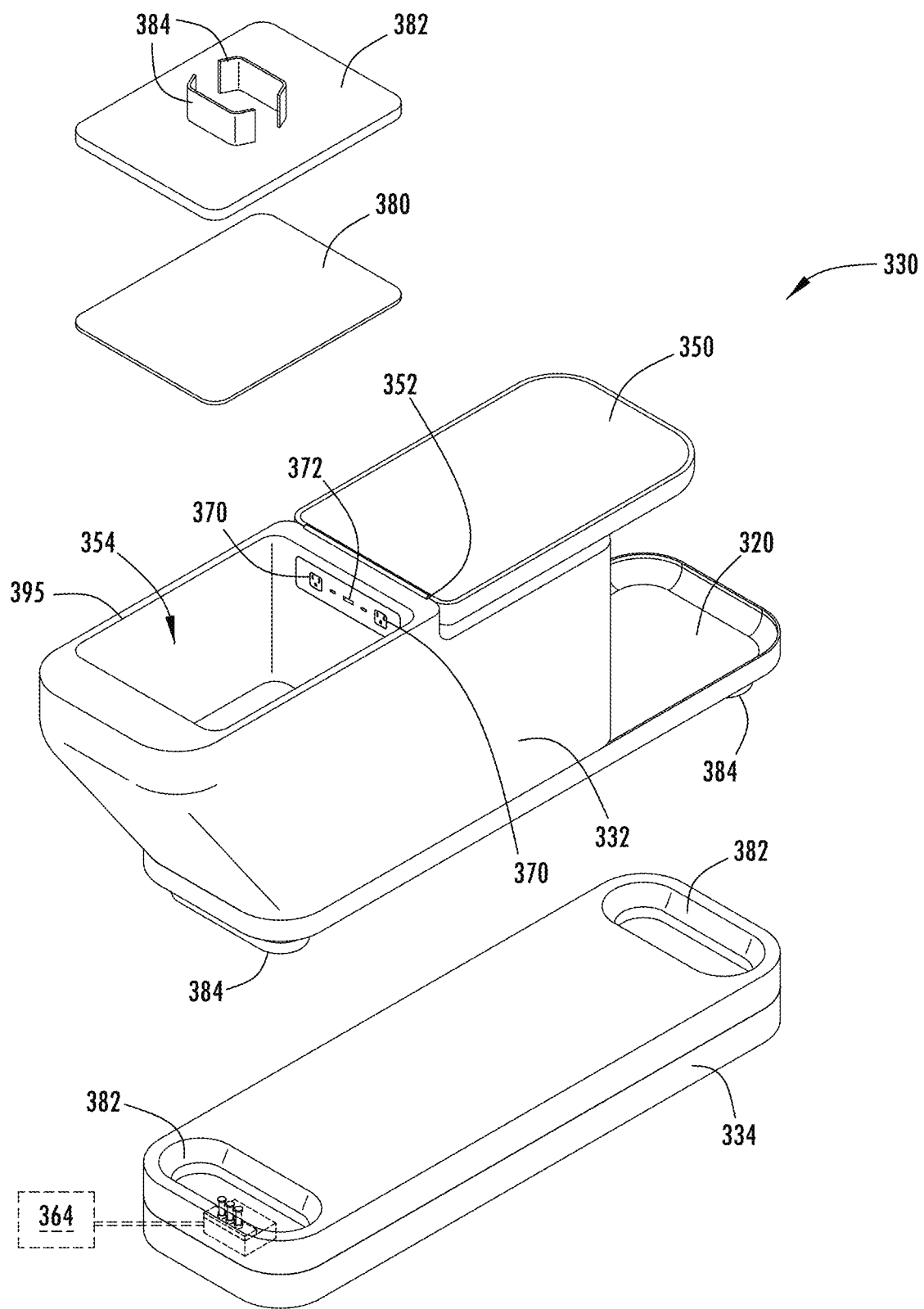
FIG. 15 is an enlarged exploded rear perspective view of the center console illustrated in FIG. 14A.
Figure 16:
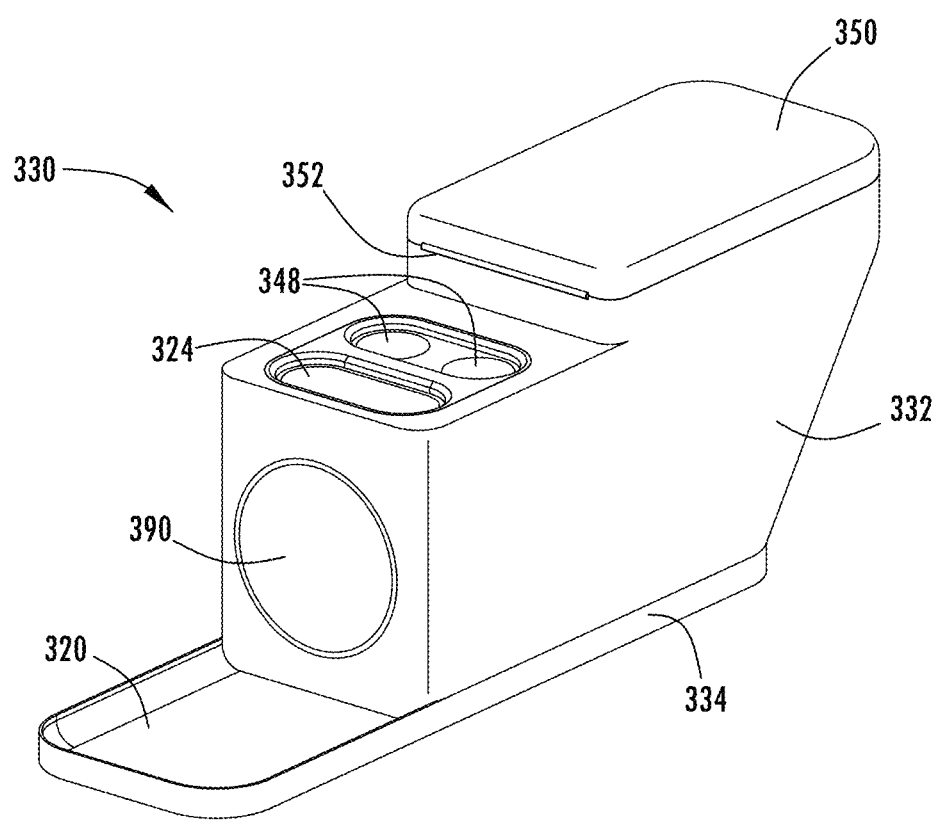
FIG. 16 is a front perspective view of the center console illustrated in FIG. 14A further illustrating an audio speaker.

Referring to FIG. 15, it should be appreciated that the main compartment 354 may include an inductive charging mat 382 installed on top of a floor console mat 380 inside of the main compartment 354. The inductive charging mat 382 may provide electrical power wirelessly via induction to charge one or more electrically powered devices or batteries in the electrically powered devices onboard the motor vehicle while held within the main compartment 354. The inductive charging may use charging coils in the compartment that inductively couples with charging coils in the device or batteries. A pair of brackets 384 are shown for holding one or more electronic devices, such as for positioning the devices to be charged in position with the inductive charger to maintain sufficient charging coupling.

The vehicle console 330 further includes a media audio device, such as an audio speaker 390, shown located at the front end of the housing 332. The audio speaker 39 may be a wired speaker wired to one or more vehicle electronic, according to one example. It should be appreciated that the audio speaker 390 may be a wireless speaker according to another example that may communicate with one or more electronic devices via wireless communication such as Bluetooth® or other wireless communication.

In addition, the motor vehicle 10 is shown equipped with a hanger 356 for hanging one or more electrical devices, such as a pair of earphones or headphones 358 as seen in FIG. 14C. As such, the headphones 356 may be used with the game controller 360 and the control module 362 to provide audio sound and to provide a microphone, if needed. The vehicle console 330 is positioned vehicle rearward of a front display device 24 which is shown located on the dashboard 26 of the vehicle 10. The front display device 24 may be a touchscreen display and may provide user inputs and may provide outputs, such as video outputs for outputting media, such as gaming data or gaming videos. As such, one or more passengers seated in the motor vehicle 10 may utilize the vehicle console 330 as a media console to provide media accessories for storage and use on the motor vehicle 10.

Figure 17:
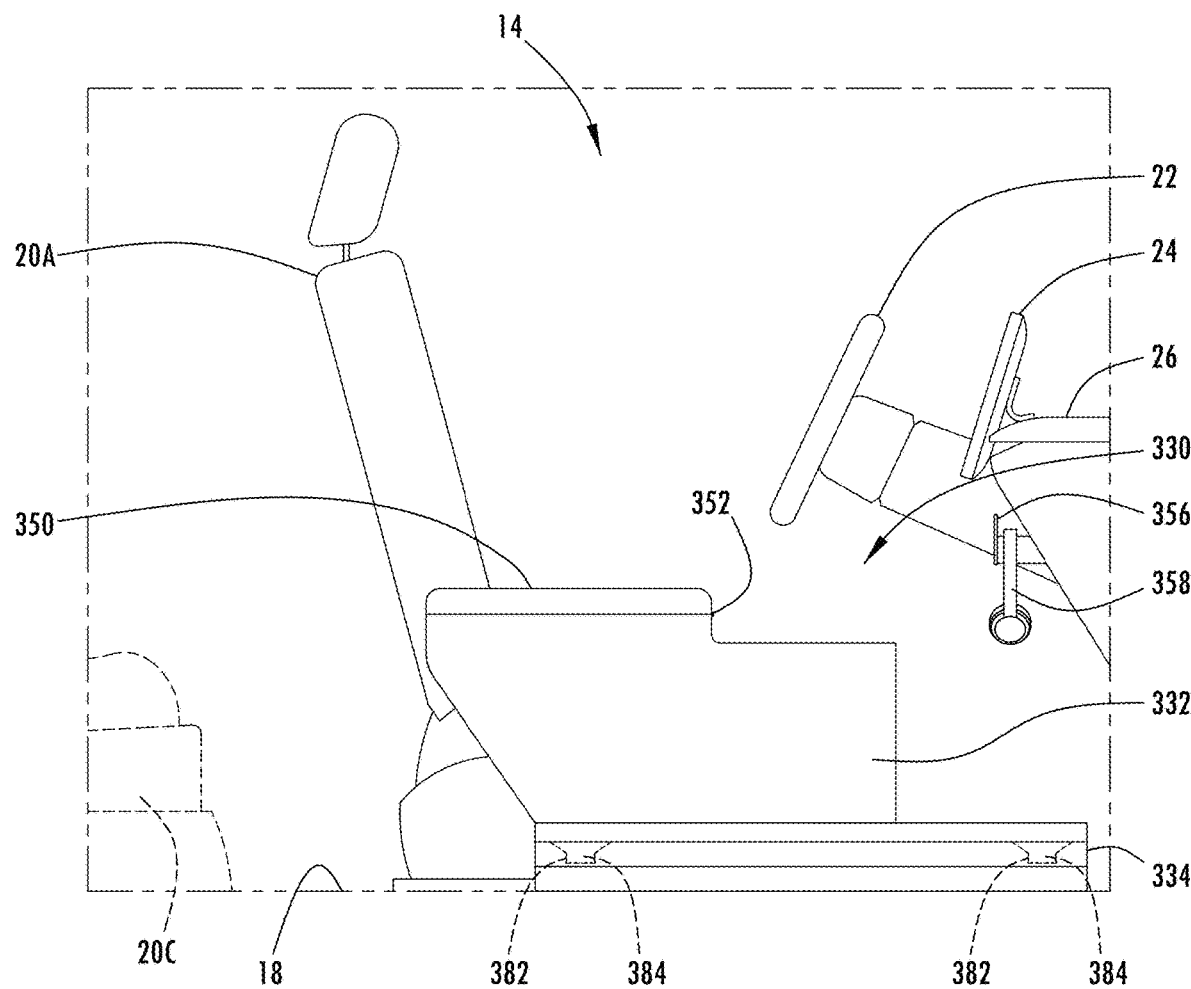
FIG. 17 is a schematic side view of the center console illustrated in FIG. 14A.
Figure 18A:
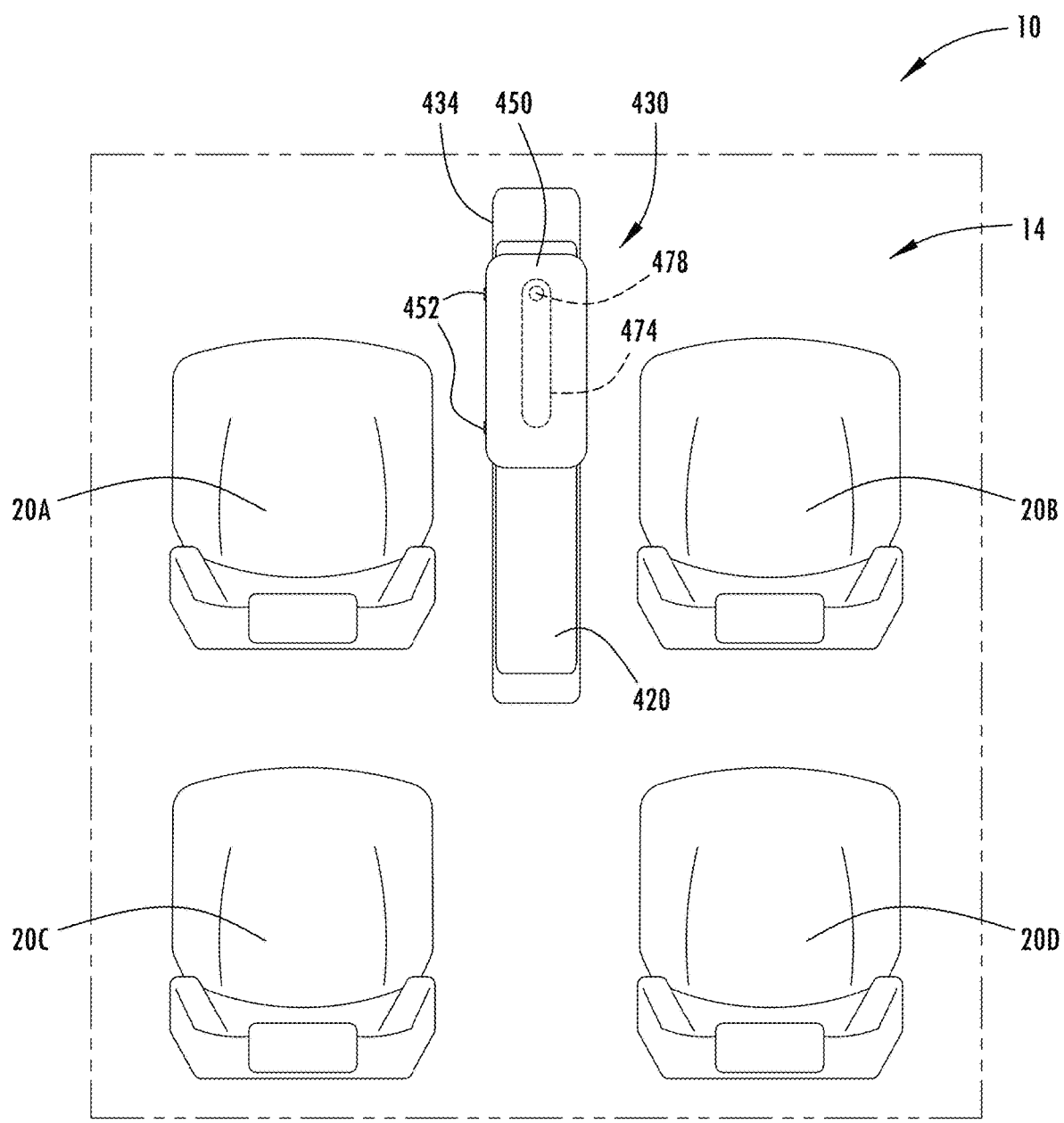
FIG. 18A is a top view of the cabin interior having a fifth embodiment of a center console with an armrest lid configured to provide a positional deployable table.
Figure 18B:
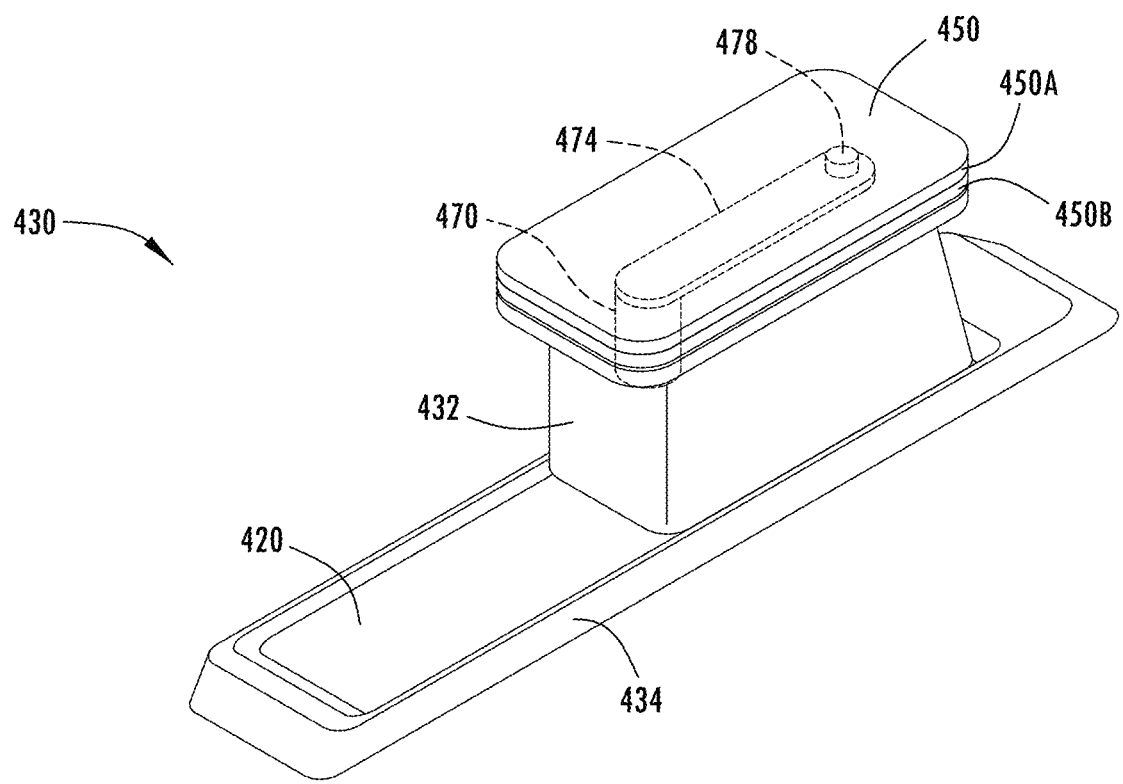
FIG. 18B is a rear perspective view of the center console illustrated in FIG. 18A with armrest lid in a closed lid position.

The base 334 of vehicle console 330 is illustrated in FIG. 15 having a pair of female connectors in the form of receptacles 382 located at or proximate to opposite front and rear ends of the base 334. The female receptacles 382 are configured to be engaged with a pair of male connectors 384 located on the bottom surface of the housing 332 as seen in FIGS. 15 and 17. As such, the male connectors 384 engage the female connectors 382 to fixedly hold the housing 332 in place on the base 334. It should be appreciated that the male connectors 384 may include snap connectors that snap into place or twist connectors that twist-lock onto and off the base 334. As such, a passenger or user may disconnect the housing 332 from the base 334 and may swap the housing 332 out for a replacement housing and reconnect the replacement housing on the base 334.

Accordingly, the vehicle console 330 advantageously provides for a media console having various media-related features and accessories for use on the motor vehicle 10. The vehicle console 330 may be swapped out and replaced with a different replacement console, such as another media console.

Positionable Worktable

Referring to FIGS. 18A-26B, a fifth embodiment of a vehicle console 430 in the cabin interior 14 of the motor vehicle 10 is illustrated. The vehicle console 430 is shown and described herein as a center console supported on the vehicle floor 18 and located in the space between the driver seat 20A and the passenger seat 20B in the front row of the motor vehicle 10. The center console 430 may be connected to the vehicle floor 18 or other supporting structure via fasteners, such as bolts or screws, or otherwise welded or connected to the supporting structure. In this embodiment, the center console 430 includes a deployable table that may be deployed to a plurality of positions within the cabin interior 14 of the vehicle 10. In addition, the vehicle console 430 has a housing 432 that may be removably connected to a base 434 fixed on the vehicle floor 18 and may be swapped out for a different replacement housing.

Figure 19A:
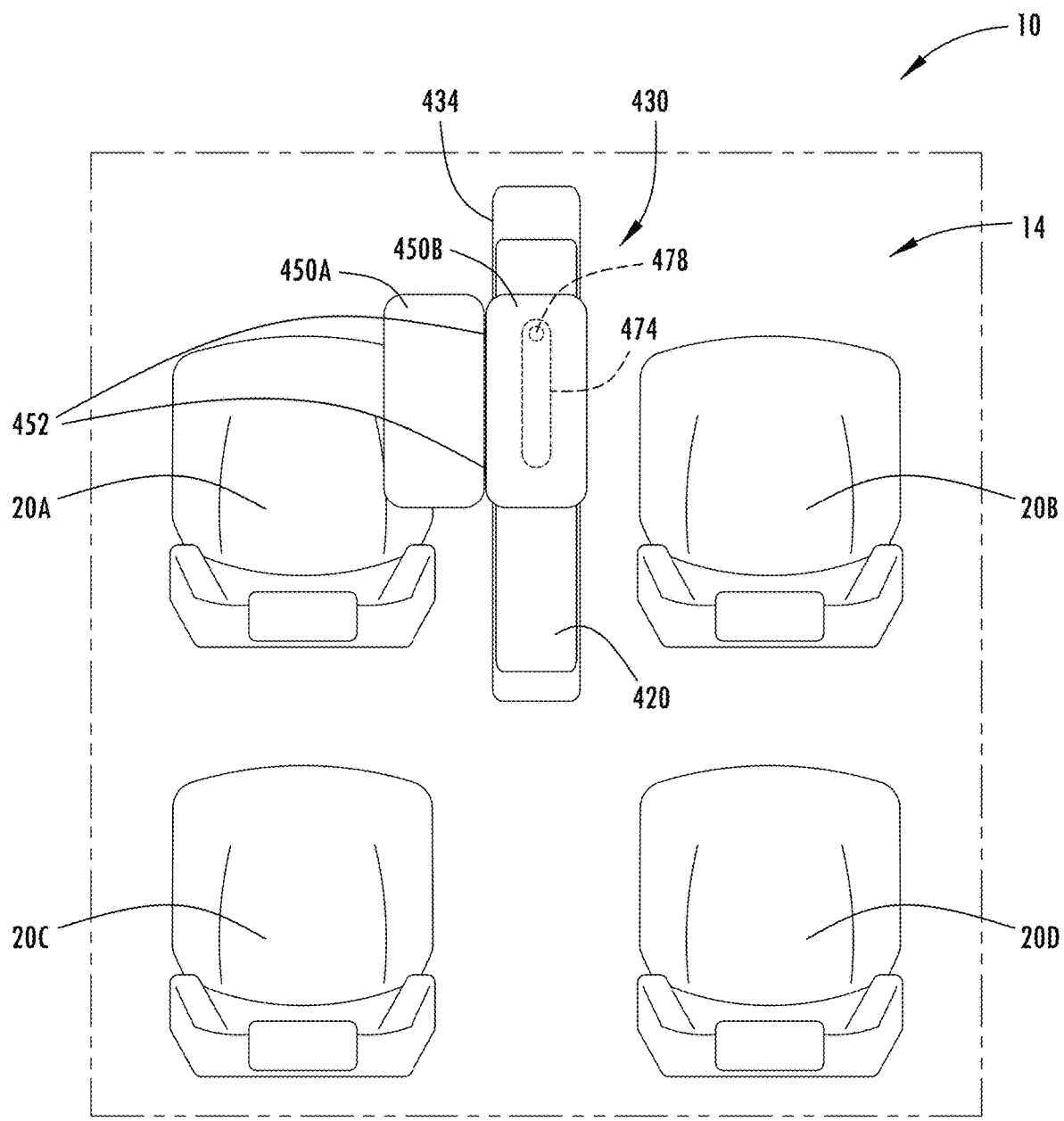
FIG. 19A is a top view of the cabin interior showing the center console of FIG. 18A with the armrest lid deployed in a first deployable table position.
Figure 19B:
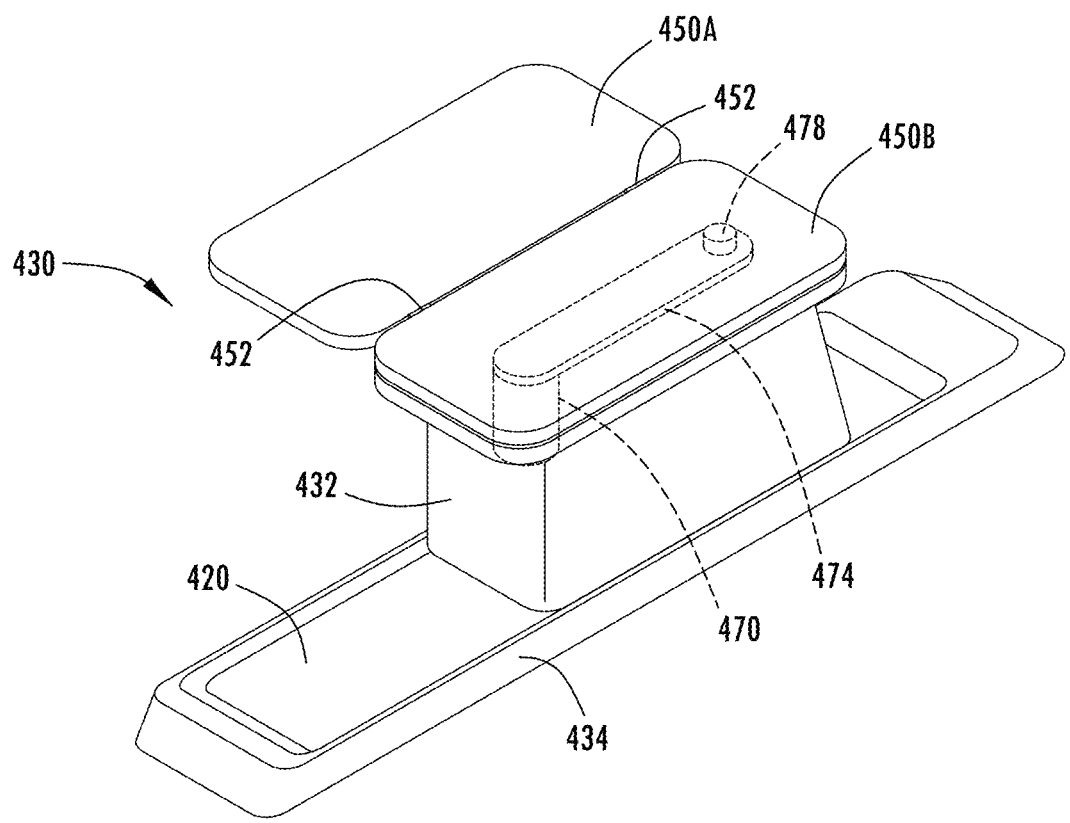
FIG. 19B is a rear perspective view of the center console shown in FIG. 19A with the table in the first deployable table position.

The vehicle console 430 includes the base 434 having removable fasteners for removably connecting the base 434 to the vehicle floor 18 or a support on the vehicle floor 18. The base 434 generally has a planar upper surface 420 upon which the housing 432 is located. The housing 432 is positioned on the planar surface 420 along a longitudinal track and may move such as by sliding forward and rearward on top of surface 420. The housing 432 generally defines a storage compartment 454 and has an access opening 495 on the top thereof. The storage compartment 454 has a space that may hold one or more items. Disposed across the top of the access opening 495 of the storage compartment 454 as an armrest lid 450 which serves as a lid and an armrest also serves as a deployable table. The armrest lid 450 is shown in the closed position in FIGS. 18A and 18B fully covering the access opening 495 of the storage compartment 454. The armrest lid 450 has a first table 450A pivotally connected to a second table 450B via one or more hinges 452. As such, the first table 450A may pivot about the one or more hinge 452 along a lateral side from the second table 450B to provide an expanded worksurface table as seen in FIGS. 19A and 19B.

Figure 20A:
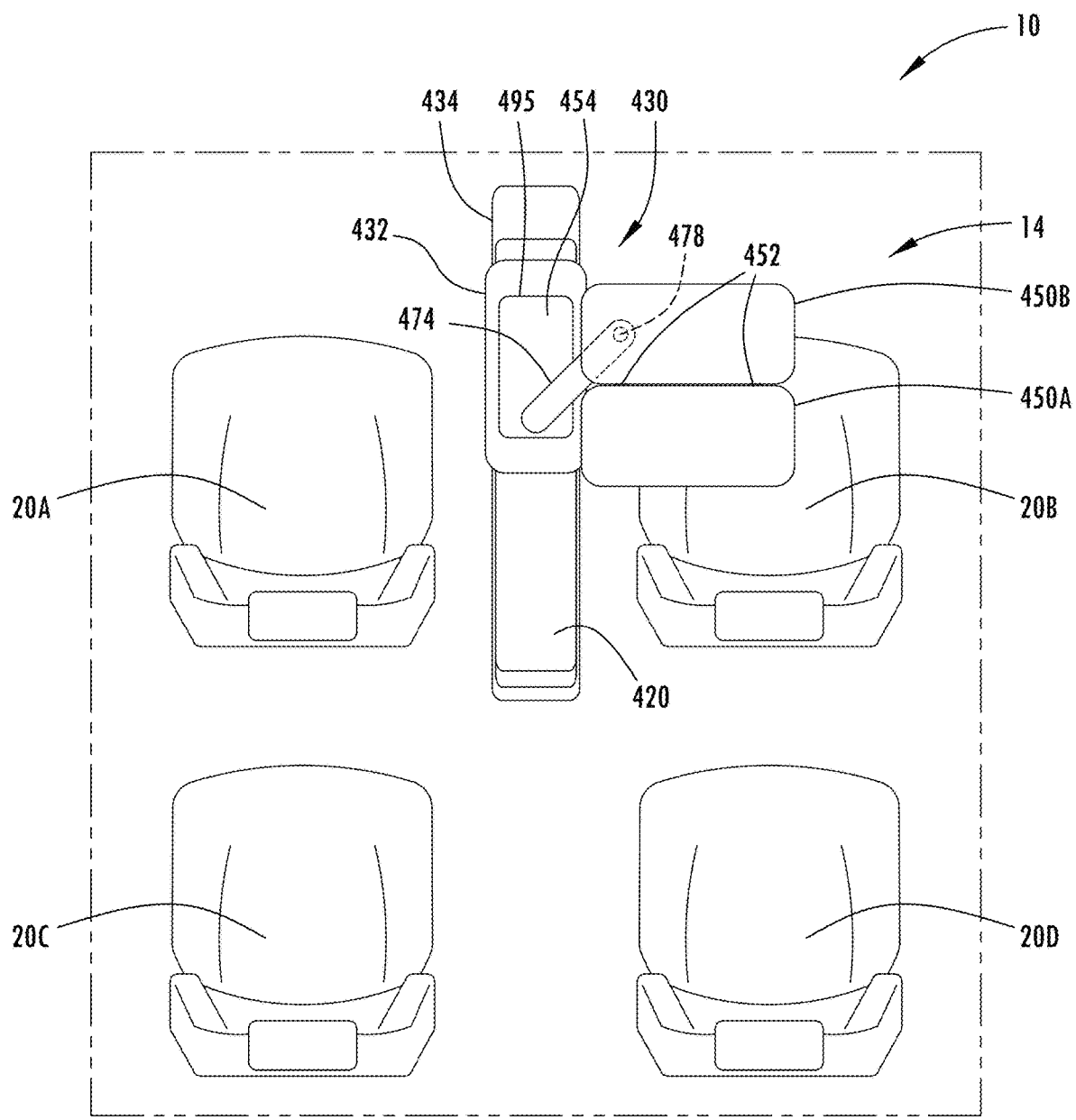
FIG. 20A is a top view of the cabin interior of FIG. 18A showing the center console with the armrest lid deployed in a second deployed table position.
Figure 20B:
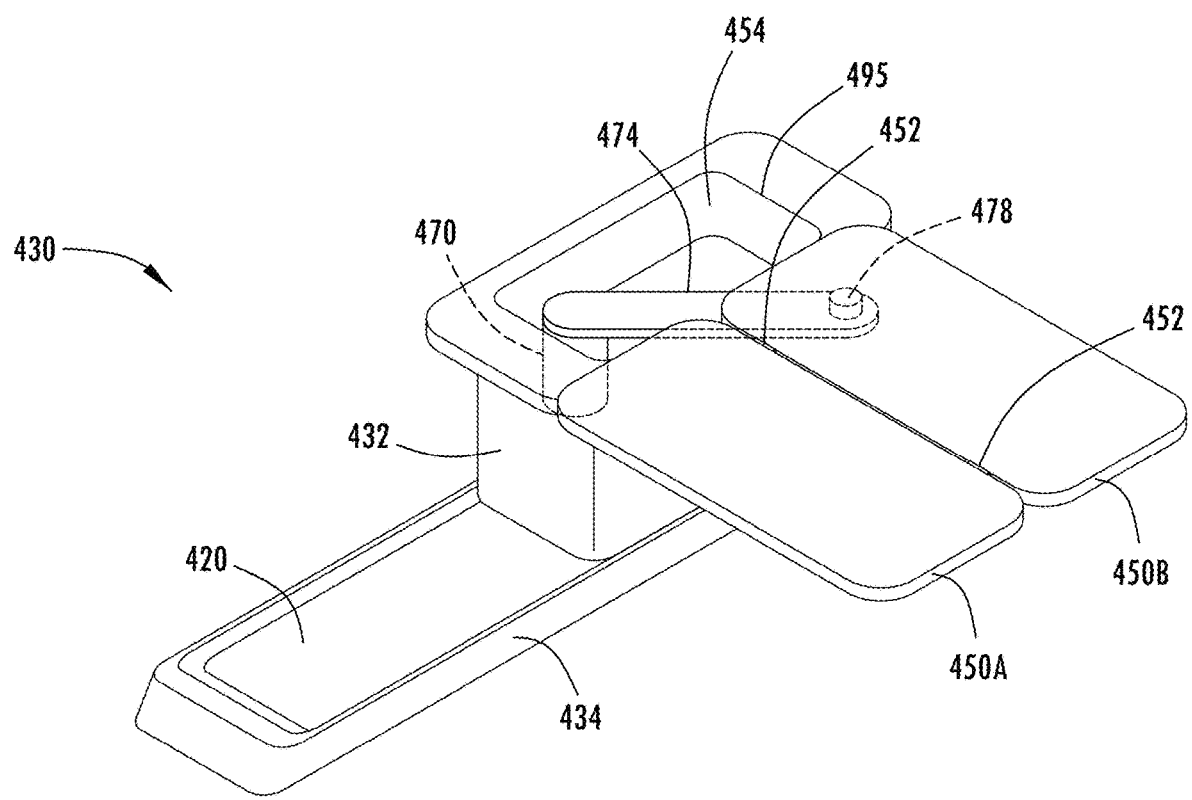
FIG. 20B is a rear perspective of the center console shown in FIG. 20A with the armrest lid in the second deployed table position.
Figure 21A:
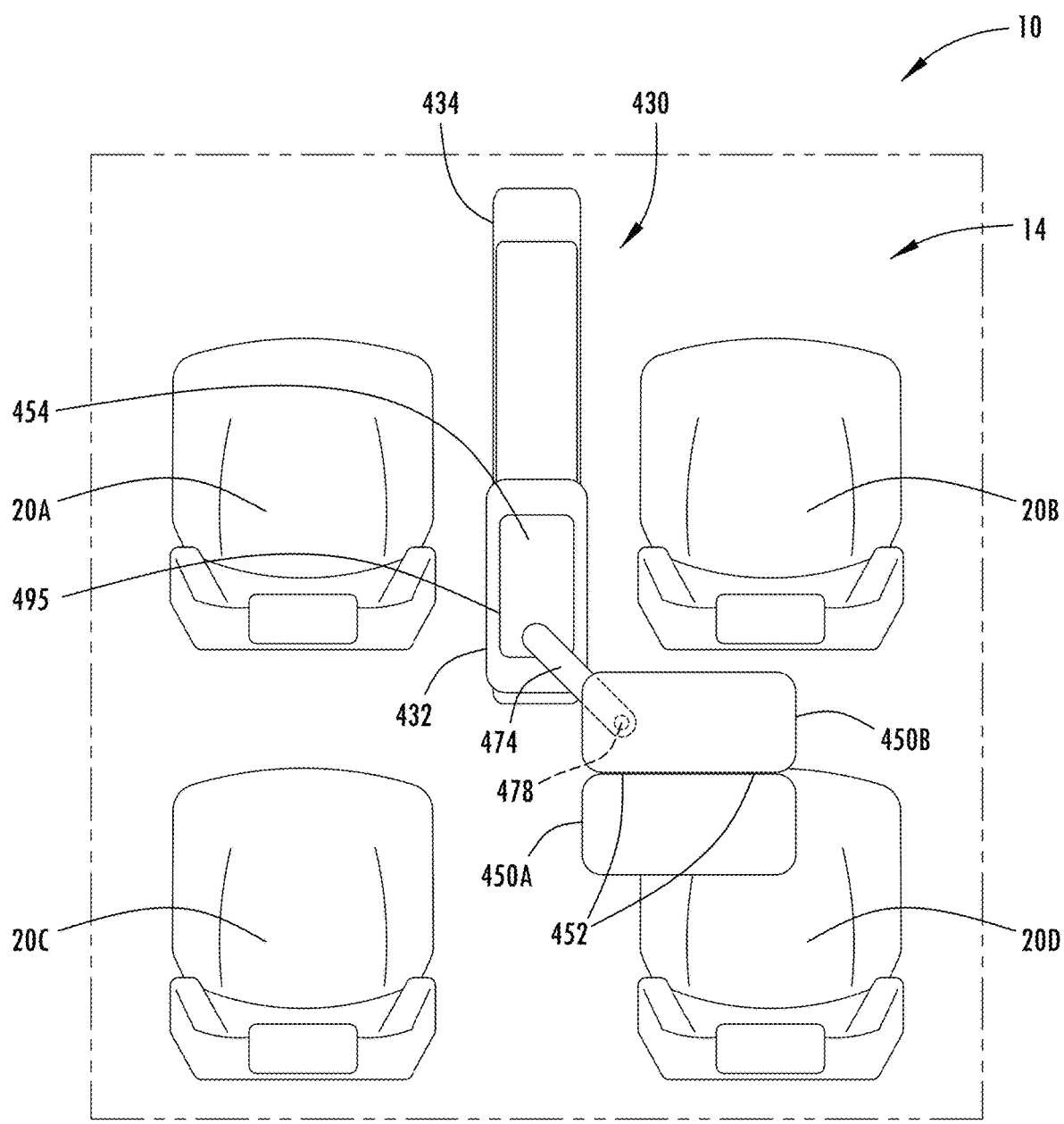
FIG. 21A is a top view of the cabin interior showing the center console of FIG. 18A with the armrest lid further deployed in a third deployed table position.
Figure 21B:
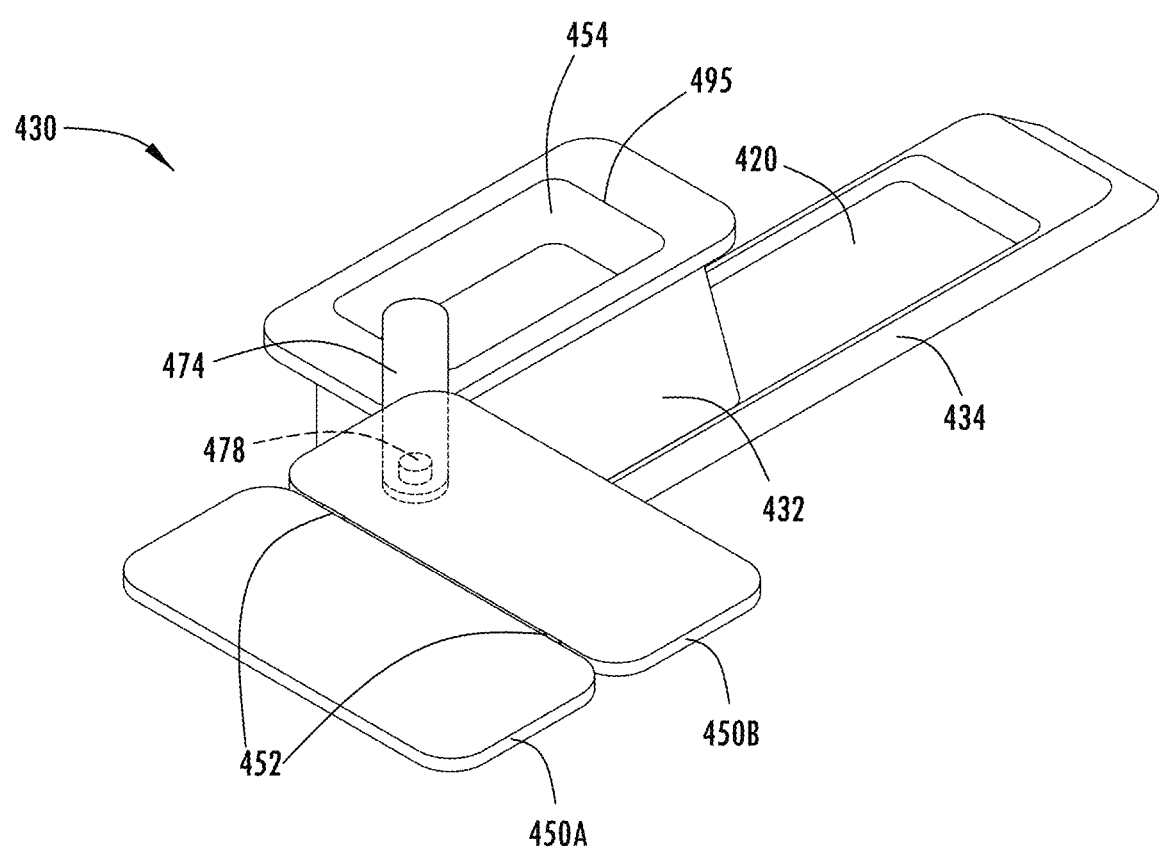
FIG. 21B is a rear perspective view of the center console shown in FIG. 21A with the armrest lid deployed in the third deployed table position.
Figure 22:
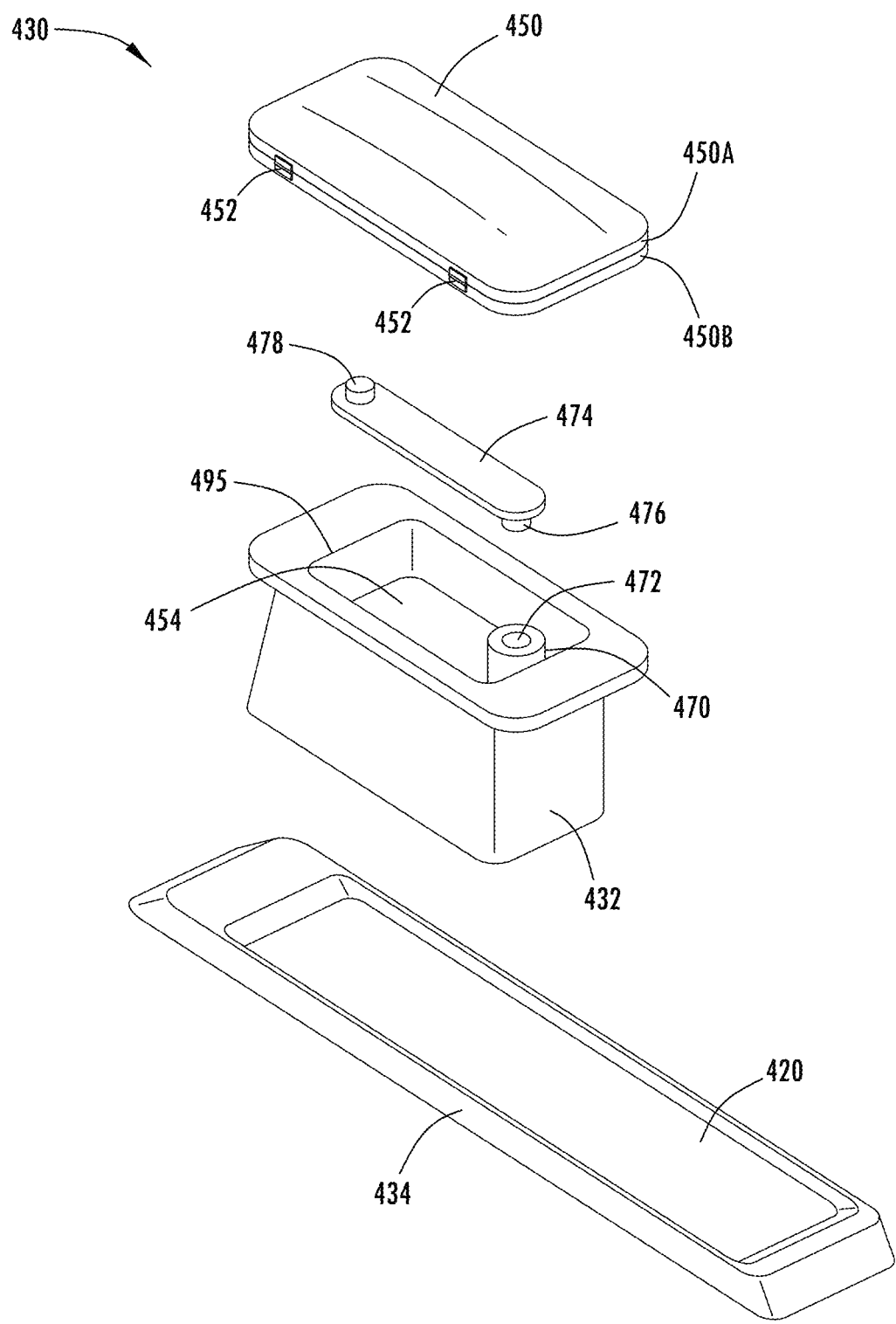
FIG. 22 is an enlarged exploded perspective view of the center console illustrated in FIG. 18A.
Figure 23:
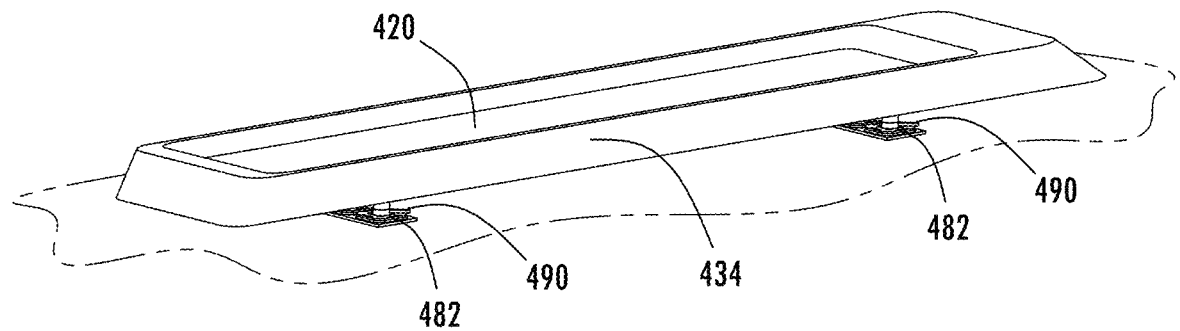
FIG. 23 is an upper perspective view of the base of the center console shown in FIG. 18A with male leg connectors for connecting the base to the vehicle floor.
Figure 24:
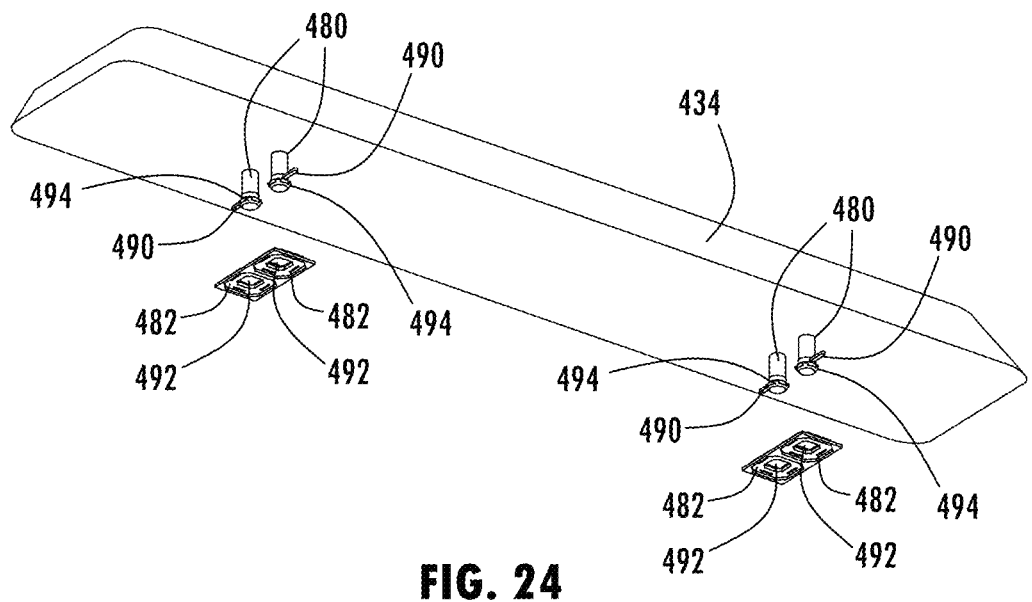
FIG. 24 is a lower perspective view shown in FIG. 23 showing the male leg connectors positioned to engage female floor connectors.
Figure 25A:
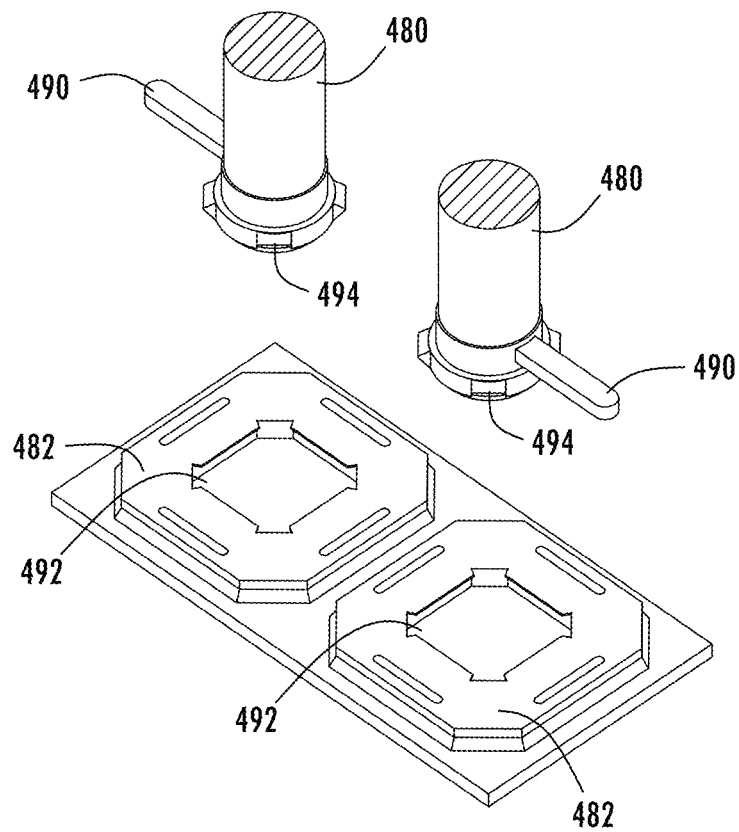
FIG. 25A is an enlarged perspective view of the male leg connectors aligned to engage the female connectors on the vehicle floor.
Figure 25B:
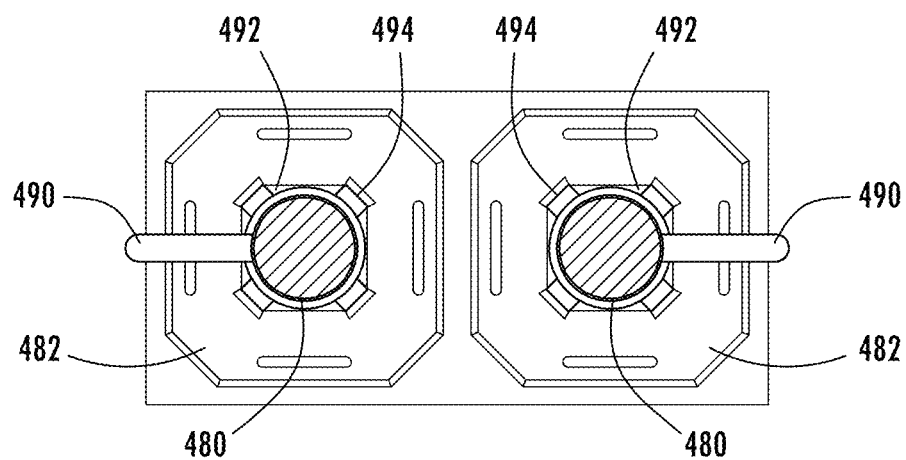
FIG. 25B is a top view of the male leg connectors engaged in the female floor connectors in the unlocked position.
Figure 26A:
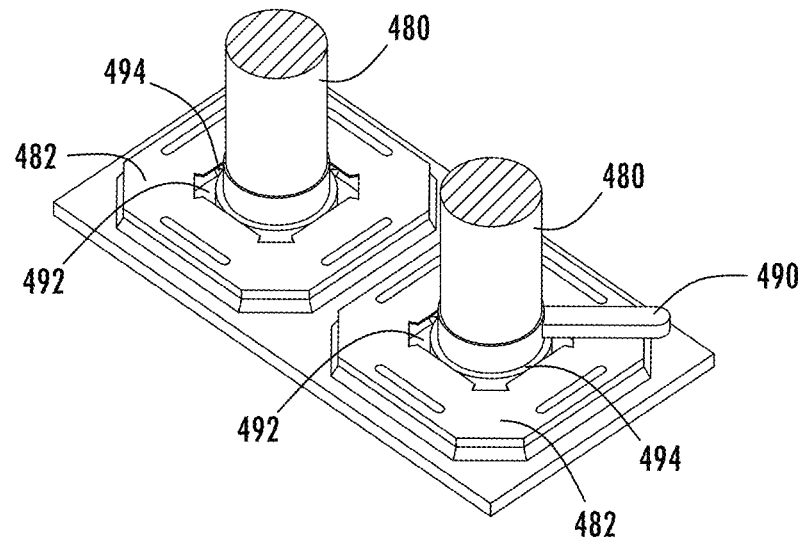
FIG. 26A is an upper perspective view of the male leg connectors engaged in the female floor connectors in a locked position.
Figure 26B:
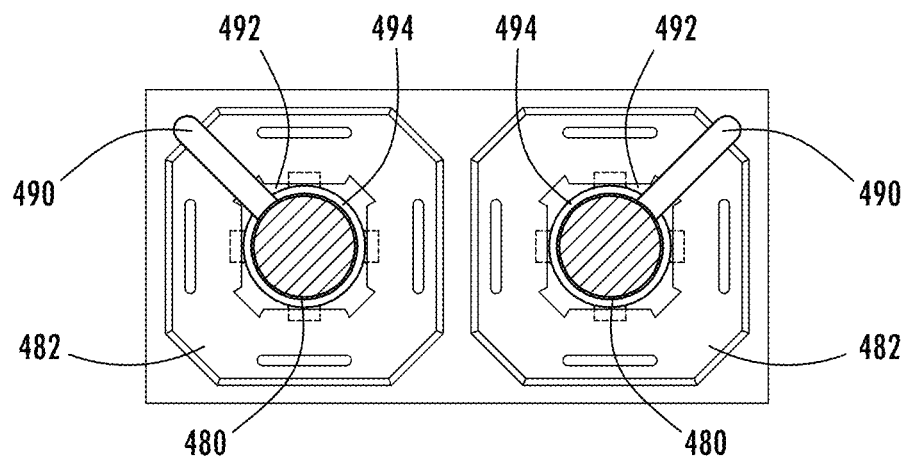
FIG. 26B is a top view of the male leg connectors engaged in the female floor connectors shown in the locked position.

The first worktable 450A is connected to the storage compartment 454 via an upstanding support post 470 and a horizontal support arm 474 which pivots relative to the support post 470. The support arm 474 has a pivot pin connector 478 extending vertically upward which engages a recess in the lower surface of the second worktable 450B. The opposite end of the control arm 474 has a lower extending pivot pin 476 that engages a slot 472 at the top surface of the support post 470. As such, the support arm 474 is able to pivot relative to the support rod 470 to rotate the armrest lid 450 as a worktable amongst a plurality of positions. For example, the worktable 450A in a deployed position as seen in FIG. 19A can be rotated to a second position as seen in FIGS. 20A and 20B in which the table moves from a position proximate to the driver seat assembly 20A to a position proximate and forward of the front passenger seat assembly 20B. This enables a passenger seated in the front passenger seat to use the worktable. The worktable 450A may further be rotated to a third position as seen in FIG. 21A. In this position, the housing 432 slides vehicle rearward along the track on planar upper surface 420 towards the rear second row of seating. In a third position, the deployed worktable 450A is presented proximate to and forward of the rear seat assembly 20D. This enables a passenger seated in the rear seat assembly 20D to have access to the worktable. It should further be appreciated that the worktable 450A may further be rotated and positioned proximate to the opposite lateral side seat assembly 20C in the second row of seating. This enables a passenger seated in the rear seat assembly 20C to have access to the worktable. As such, the vehicle console 430 advantageously provides a multipositional workstation that may be moveably positioned and presented for use to a plurality of seated passengers in the vehicle 10.

Referring to FIGS. 23A-26B, the connection of the base 434 to the vehicle floor 18 is illustrated, according to one example. The bottom side of the base 434 has a plurality of downward extending legs 480 that form a connector assembly. In the example shown, four legs 480 are provided, with two legs located towards a front end of the base 434 and the other two legs located towards a rear end of a base 434. Each of the legs 480 has a shaped foot 494 on the bottom end thereof and a locking lever 490 operatively coupled to a cam surface associated therewith. In this example, the vehicle floor 18 has a plurality of matching receptacles 482 each having a shaped opening 492 for receiving the shaped feet 494 on legs 480. According to one example, the shaped surface has an octagonal shape and the locking feet 494 are also octagonal in shape. The shaped feet 494 may be inserted into the openings 492 and the lever 490 may be rotated so that the shapes of the feet and receptacle misalign and lock the feet 494 within the opening 492. It should be appreciated that the locking lever 490 may engage a cam surface to maintain a frictional engagement upon turning a quarter of a turn (90°), for example. However, it should be appreciated that the lever 490 may be turned more than a quarter turn or less than a quarter turn, according to other examples.

The connecting legs 480 and locking feet 494 may further include an electrically conductive material such that they may serve as electrical connectors for supplying power and/or data communication through the base 434 to the housing 432. As such, the connecting feet may also serve as power and communication connecting features.

The vehicle console 430 may be easily assembled onto the vehicle floor 18 or other vehicle structure using the connector arrangement described herein. For example, a vehicle console 430 may be removed easily from the vehicle floor 18 and replaced with another swappable vehicle console simply by disconnecting the four legs and feet to remove the console and reconnecting the four legs and feet on the replacement console.

It should be appreciated that the various vehicle consoles shown and described herein may be standalone units in some embodiments, and may include interchangeable modules, according to further embodiments, and may further be swappable to replace the console from the motor vehicle as shown and described herein. Features of any of the center consoles may be employed on other of the center consoles shown and described herein. While modern OEMs of passenger vehicles would currently warn against using the deployable table or positionable table while the vehicle is in motion due to safety concerns, it is anticipated that technology and the regulatory framework may evolve in the future to where such an activity is safe and permissible.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle console comprising:
   a base;
   a connector assembly configured to connect the base to a vehicle support;
   a housing supported on the base, the housing comprising a first compartment and a second compartment;
   a lid covering the first compartment and defining an armrest on a top surface;
   at least one tray for holding one or more items in position within the second compartment;
   a display device supported by the housing; and
   at least one airflow duct extending through the housing from the base and having an airflow outlet for passing airflow.

2. The vehicle console of claim 1, wherein the display device provides a user interface to access one or more items in the at least one tray.

3. The vehicle console of claim 2, wherein the items comprise items for sale or servicing.

4. The vehicle console of claim 1, wherein the tray has a showcase for displaying the one or more items.

5. The vehicle console of claim 1, wherein the console is configured as a center console.

6. The vehicle console of claim 1, wherein the display is located on a rear end of the housing proximate to seating rear of the console.

7. The vehicle console of claim 1, wherein the lid comprises a deployable table.

8. The vehicle console of claim 1 further comprising a third compartment that defines a garbage container.

9. The vehicle console of claim 8, wherein the garbage container comprises a rim for holding a bag.

10. The vehicle console of claim 1, wherein the housing is removable from the base.

11. A vehicle center console comprising:
    a base;
    a connector assembly configured to connect the base to a vehicle support;
    a housing supported on the base, the housing comprising a first compartment and a second compartment;
    a lid covering the first compartment and defining an armrest on a top surface;
    at least one tray for holding service supplies in position within the second compartment;
    a display device supported by the housing, wherein the display device provides a user interface to access one or more items in the tray; and
    at least one airflow duct extending through the housing from the base and having an air outlet for passing airflow.

12. The vehicle center console of claim 11, wherein the items comprise items for sale or servicing.

13. The vehicle center console of claim 11, wherein the display is located on a rear end of the housing proximate to seating rear of the console.

14. The vehicle center console of claim 11, wherein the lid comprises a deployable table.

15. The vehicle center console of claim 11 further comprising a third compartment that defines a garbage container.

16. The vehicle center console of claim 15, wherein the garbage container comprises a rim for holding a bag.

17. The vehicle center console of claim 11, wherein the housing is removable from the base.

18. The vehicle center console of claim 11, wherein the tray has a showcase for displaying the one or more items.

* * * * *